(12) United States Patent
Andreadakis

(10) Patent No.: US 11,068,240 B1
(45) Date of Patent: Jul. 20, 2021

(54) APERIODIC PSEUDO-RANDOM NUMBER GENERATOR USING BIG PSEUDO-RANDOM NUMBERS

(71) Applicant: Panagiotis Andreadakis, Alimos (GR)

(72) Inventor: Panagiotis Andreadakis, Alimos (GR)

( * ) Notice: Subject to any disclaimer, the term of this patent is extended or adjusted under 35 U.S.C. 154(b) by 0 days.

(21) Appl. No.: 16/926,376

(22) Filed: Jul. 10, 2020

Related U.S. Application Data

(60) Provisional application No. 63/041,530, filed on Jun. 19, 2020.

(51) Int. Cl.
*G06F 7/58* (2006.01)

(52) U.S. Cl.
CPC .................... *G06F 7/582* (2013.01)

(58) Field of Classification Search
CPC .................................. G06F 7/58–586
See application file for complete search history.

(56) References Cited

U.S. PATENT DOCUMENTS

| | | | | |
|---|---|---|---|---|
| 5,600,723 A * | 2/1997 | Woodall | ................... | B60R 25/04 123/179.2 |
| 6,502,116 B1 * | 12/2002 | Kelly | ...................... | G06F 7/582 463/16 |
| 2004/0098303 A1 * | 5/2004 | Truong | ............... | G06Q 30/0225 705/14.26 |
| 2007/0094161 A1 * | 4/2007 | Calabro | ................. | B82Y 10/00 706/13 |
| 2007/0233762 A1 * | 10/2007 | Sudhakar | ................. | G06F 7/582 708/250 |
| 2017/0163416 A1 * | 6/2017 | Hars | ...................... | H04L 9/0625 |
| 2018/0316487 A1 * | 11/2018 | Choi | ........................ | G06F 7/723 |
| 2018/0316498 A1 * | 11/2018 | Choi | ...................... | G06F 21/755 |
| 2019/0196791 A1 * | 6/2019 | Zhang | ........................ | G06F 7/58 |

\* cited by examiner

*Primary Examiner* — Aimee Li
*Assistant Examiner* — Carlo Waje
(74) *Attorney, Agent, or Firm* — Franco S. De Liguori; DP IP Group

(57) ABSTRACT

The present innovative solution solves the problem of generating pseudo-random numbers that have practically infinite period, while requiring limited processing resources and operating significantly faster that known pseudo-random number generators. A sequence of big pseudo-random numbers is created using a large seed number calculated as the product of three large constants entered by a user or fed by a computer clock. The big pseudo-random numbers are then selectively split into a sequence of aperiodic pseudo-random numbers which are then output for use in any suitable application and for seeding the present generator.

20 Claims, 12 Drawing Sheets

US 11,068,240 B1

APERIODIC PSEUDO-RANDOM NUMBER GENERATOR USING BIG PSEUDO-RANDOM NUMBERS

CROSS-REFERENCE TO RELATED APPLICATIONS

This application claims priority to U.S. Provisional Patent Application Ser. No. 63/041,530, filed on 19 Jun. 2020, and entitled "APERIODIC PSEUDO-RANDOM NUMBER GENERATOR".

This application is further related to commonly-owned U.S. Non-Provisional Patent application Ser. No. 16/926,342, filed on Jul. 10, 2020, and entitled "APERIODIC PSEUDO-RANDOM NUMBER GENERATOR BASED ON A LINEAR CONGRUENTIAL GENERATOR"

BACKGROUND

Field

The present invention relates to an aperiodic a generator of Aperiodic Pseudo-Random Number (APRN) sequences based on a deterministic Random Number Generator (RNG) using the numerical Entropy of the digits of large numbers.

Background

A Pseudo-Random Number Generator (PRNG) is a computer or mechanical device designed to produce a sequence of numbers or symbols that do not follow a pattern thus, they appear random. PRNGs operate with an initial seed that is used to kickstart the production of the pseudo-random numbers.

RNGs are routinely used in lucky games, online casinos, sampling for statistics, simulations, cryptography, completely random design, and other areas where the production of an unpredictable result is desirable. In general, where unpredictable numbers are of the utmost importance—as in security applications—mechanical generators are preferred (where possible) over pseudo-random algorithms. Also, random number generators are very useful in Monte Carlo algorithms and simulations, because the debugging is facilitated by the ability of generators to produce the same sequence of random numbers in many runs of the same application. RNGs are also used in cryptography where the seed is kept secret so as to prevent hackers from calculating the next numbers in the sequence of pseudo-random numbers produced by the generator.

There are several random number generators with different behaviors in the randomness of their outputs, such as the MERSEN TWISTER, XORSHIFT128, XOROSHIRO128+, etc. In practice, these generators may fail several evaluation tests due to the following disadvantages:

they limit the potential seeds (i.e. initial conditions) that can be used for not limiting the expected periods of the generated pseudo-random numbers. The non-allowable seeds (termed "weak" seeds) limit the pool of seeds that can be used, rendering the generators weaker for cryptographic applications, as hackers can correctly guess the random numbers faster, i.e. make it practical using available processing power. Similarly, if a weak seed is used, the period of the generated pseudo-random number sequence is shortened, effectively limiting the random nature of the generated sequence.

Lack of uniformity of the distribution of the produced numbers. This may result in the biased pseudo-random numbers in the sequence and, consequently, affect the applications where these numbers will be used.

Relationship between successive numbers of the sequence. "Poor" dimensional distribution of the numbers produced in the sequence. Similar to lack of uniformity, the relationship between successive numbers in the sequence can bias the sequence and, consequently, affect the applications where these numbers will be used.

The distances between specific values that are displayed are distributed differently from the corresponding distances in a truly random sequence of random numbers. Again, this difference causes biases.

Possible random sequences are limited, because the number of the random seeds are also limited. This has negative effects to the applications using the generated Pseudo Random Numbers (PRN).

Not cryptographically secure as the attacker can successfully predict the next random number by analyzing a sample of random numbers in the sequence.

Many of the known PRNG implementations have additional limitations, like requiring heavy processing for the production of the PRN sequences. Such a limitation is very significant as the length of the seed and/or the generated numbers is increased (e.g. dozens of digits-long in prior art, or hundreds or thousands of digits long in the present innovative PRNG). It may not sound very limiting but there are many situations where the processing power and/or the local storage is scarce and expensive such as in portable devices, credit cards, Internet-Of-Things (IOT) devices, etc. but also in servers handling huge numbers of requests for pseudo random numbers as in banking environments, etc.

There is a clear need for a PRNG that requires lower processing power and is faster in creating PRN sequences of practically infinite period (i.e. practically truly random) compared to known PRNGs, can operate with virtually any initial condition (i.e. any seed), is suitable and secure for use in a variety of applications, including statistical simulations and cryptography, and is portable for running under any computing environment.

SUMMARY

The present innovative solution solves the problem of generating pseudo-random numbers that have practically infinite period, while requiring limited processing resources and operating significantly faster that known pseudo-random number generators. A sequence of pseudo-random numbers is created using a large seed number and are used to create a big number. The big number is then selectively split into a sequence of aperiodic pseudo-random numbers which are then output for use in any suitable application and for seeding the present generator.

In a first exemplary implementation, the pseudo random number is implemented as a linear congruential generator and the big number generator as an adder or the numbers produced by the linear congruential generator raised to a power of a counter. A seed number first set to 0 or taken from a computer clock, is used to seed the linear congruential generator. The calculation of the pseudo-random numbers of the linear congruential generator and the final aperiodic pseudo-random numbers is simplified by replacing multiplications, mod and div operations with simple lookup operations at precomputed tables of results. Special hardware (using half and full adder circuits) and software implementations are proposed for the simplified calculations. The calculated aperiodic pseudo-random numbers are then output for use by any applications and may also be used to seed the linear congruential generator.

In a second exemplary implementation, the linear congruential generator is seeded with a number produced by the multiplication of three constants that are user input or derived from a computer clock. Subsequent pseudo-random numbers are produced by using the previously calculated pseudo random number and multiplying it with a constant serially selected from a set containing the three constants.

In a third exemplary embodiment, the linear congruential generator is seeded with a number produced by the multiplication of three constants that are user input or derived from a computer clock. Subsequent pseudo-random numbers are produced by using the previously calculated pseudo random number and multiplying it with a new constant derived as the remained of the partial result of the integer division of the last seed number by 10 to the power of twice the length of digits in the "previous new constant", divided by 10 to the power of the length of digits in the "previous new constant".

In a fourth exemplary implementation, the third exemplary implementation is modified by replacing AND with XOR operations.

DETAILED DESCRIPTION

Figure 1:
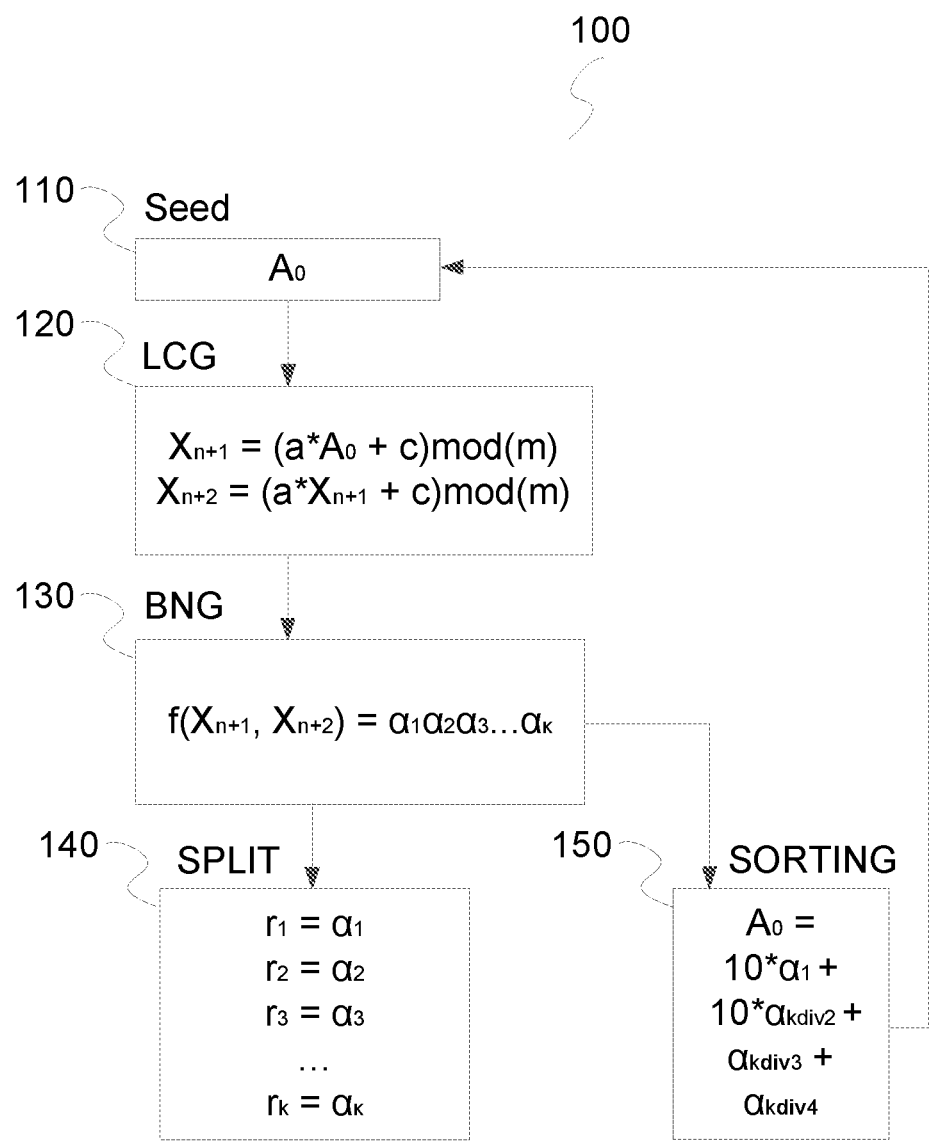
FIG. 1 shows a $1^{st}$ Exemplary Embodiment of the APRNG.

The word "exemplary" is used herein to mean "serving as an example, instance, or illustration". Any embodiment described herein as "exemplary" is not necessarily to be construed as preferred or advantageous over other embodiments.

The acronym "API" is intended to mean "Application Programming Interface".

The acronym "ASCII" is intended to mean "American Standard Code for Information Interchange".

The acronym "APRNG" is intended to mean "Aperiodic Pseudo-Random Number Generator".

The acronym "AWS" is intended to mean "Amazon Web Services".

The acronym "CD" is intended to mean "Compact Disc".

The acronym "DM" is intended to mean "Dialogue Manager".

The acronym "DSL" is intended to mean "Digital Subscriber Line".

The acronym "DVD" is intended to mean "Digital Versatile Disc".

The acronym "LAG" is intended to mean "Linear Analog Generator".

The acronym "PRN" is intended to mean "Pseudo-Random Number".

The acronym "XML" is intended to mean "eXtensible Markup Language".

The term "mobile device" may be used interchangeably with "client device" and "device with wireless capabilities".

The term "user" may be used interchangeably with "regular user", "ordinary user", and "client". It may also be used to mean "user of an application" or "user of a service".

The term "system" may be used interchangeably with "device", "computing device", "apparatus", "computing apparatus", and "service", except where it is obvious to a reader of ordinary skill in related art that these terms refer to different things, as this is apparent by the context of the discussion in which they appear. Under any circumstance, and unless otherwise explicitly stated or implicitly hinted at in the description, these four terms should be considered to have the broadest meaning i.e. that of encompassing all four.

The term "module" may be used interchangeably with "unit" or "subunit", except where it is obvious to a reader of ordinary skill in related art that these terms refer to different things, as this is apparent by the context of the discussion in which they appear.

Parameters and names in lower-case and upper-case characters are intended to mean the same thing except where it is obvious to a reader of ordinary skill in related art that these terms refer to different things, as this is apparent by the context of the discussion in which they appear, or where a different meaning is disclosed in the following description.

Technical Characteristics of PRNG in the Prior Art

When designing a PRNG one must keep in mind many features that will make the generator reliable. For example, a long period for the PRN sequence will ensure that the sequence of numbers produced is not repeated in practice (i.e. the period is very long, in the order of thousands of pseudo-random numbers), a feature that is very useful in both simulation and cryptography applications. Another desirable feature is the efficiency of the PRNG, in the sense that it should be fast to run and not use a lot of computing resources (i.e. processing power and memory). Another useful feature of a PRNG is the ability to reproduce the exact same sequence of numbers as many times as we want. This feature, commonly referred to as repeatability, is very useful in debugging, controlling and comparing programs (i.e. for the same seed the PRNG will produce the same PRN sequence). PRNGs still need to be portable, that is, work exactly the same way and have exactly the same results in different computing environments. Linear Congruential Generators (LCGs) are one of the oldest and most popular pseudo-random number generators.

Most generators that contain libraries of different programming languages are special cases of the general type of Linear Analog Generators (LAG). The reasons that make LAGs widely used are that there is a mathematical foundation for their performance that is easily understood. LAGs are also easy to implement and fast to run making them suitable even for processors and devices with limited possessing capabilities and memory. Linear Analog Generators were first introduced by D. H. Lehmer in 1949 (Knuth, Donald E. "The Art of Computer Programming, 3rd ed., Vol. 2." Seminumerical Algorithms (1998)) and have the form of: modulus ($X_{n+1}$), multiplier (a), prosthetic constant (c), seed—initial value ($X_n$). The sequence of PRNs is produced according to the retrograde formula:

$$X_{n+1}=(a*X_n+c) \bmod m \qquad \text{Equation (1)}$$

$X_{n+1}$ is the next PRN in the PRN sequence and $X_n$ is the seed in the calculation. The seed may then take the value of the last calculated PRN in subsequent iterations for the creation of new PRNs. This LAG produces purely periodic sequences as there is always a repetition of a specific sequence. In general, any sequence resulting from a deterministic generator of this form is always periodic. However, the period of the Linear Proportional Sequence is largely determined by the parameter m, because it is the one that determines the range of the generator. However, the parameter c is the one that determines the type of generator as when c is "0" we have the Multiplicative Congruential Generator (MCG) which was proposed by D. H. Lehmer, who also pointed out the possibility that the constant is non-zero. On the other hand, when parameter c is not "0", we have the Mixed Congruential Generator (MCG). The condition is that the length of the period is limited. Regarding the length of the period of the Linear Congruential Generator, it is generally true that its length is very equal to m and the choice of parameter m can greatly affect and reduce the length of the period. The HullDobell theorem specifies the conditions under which Linear Analog Generators can create sequences with the maximum possible period length. In general, the performance of LAGs show great sensitivity in the selection of parameters a, c and m. LAGs should not be used in applications that require high random numbers and do not belong to cryptographically secure generators. However, they are suitable for embedded systems where memory space is limited.

Technical Characteristics of Present Innovative PRNG

The present innovative PRNG is an Aperiodic Pseudo-random Number Generator (APRNG). APRNGs are useful in a variety of applications including, but not limited to, statistical simulations (e.g., Monte Carlo method), modeling, electronic games, mobile apps, online casino, cryptography, etc. The innovative APRNG can be implemented as hardware, software, firmware or any combination thereof.

Generally, the invention creates an aperiodic PRN sequence by generating a very large random number, and then splitting/separating the large number into groupings of digits that form a random number stream. The random number groupings can then be used directly for a particular application or purpose. In addition, one or more of the groupings of random numbers can be used to subsequently seed the APRNG to generate subsequent random number streams.

Below are sample embodiments demonstrating implementation of the APRNG.

1st Embodiment of the APRNG

FIG. 1 shows a $1^{st}$ Exemplary Embodiment of the APRNG. Referring to FIG. 1, pseudo-random number generation 100 starts with a seed number $A_0$ 110 being provided as input. The initial seed 110 can be obtained from various sources, for instance, the seed can be user provided or generated from an automated process (e.g. a computer clock). The seed can then be directed to a Linear Congruential Generator (LCG) 120 of the form:

$$Y_{n+1}=[a*Y_n+c] \bmod m \qquad \text{Equation (2)}$$

where:
a=constant number selected by the user or by an automated process
c=constant number selected by the user or by an automated process
$Y_n$=random number initially used as seed (subsequent seed values use the calculated PRN from the previous iteration)
m=constant number that is a power of 2 (e.g., 2, 4, 8, . . . ).
which produces a random number $Y_{n+1}$. Then a second random number $Y_{n+2}$ is produced from the previous random number $Y_{n+1}$. The two random numbers ($Y_{n+1}$, $Y_{n+2}$) are then directed to a Big Number Generator (BNG) 130 as shown in FIG. 1, which produces a long-length number from the two random numbers of the previous step. According to the specific exemplary implementation of the APRNG, two or more random numbers may be utilized as input to the BNG to create a more chaotic output thereby increasing randomness of the BNG output. The BNG is in the form of:

$$BNG=(Y_{n+1})^X+(Y_{n+2})^X+(Y_{n+1}+Y_{n+2})^X \qquad \text{Equation (3)}$$

where, X is a step counter, selected so that in every iteration X=X+1, i.e. X is increased by 1 after every big number calculation, effectively adding extra randomness to the BNG results.

Then the big number represented by the BNG output is split 140 into smaller groups of digits (e.g., 1 digit, 2 digits, 5 digits, etc.) as selected by the user. Each such group of digits is a random number output:
$r_1=1^{st}$ group
$r_2=2^{nd}$ group
$r_3=3^{rd}$ group
$r_k=k^{th}$ group Each group of random number output (i.e., $r_1$-$r_k$) can be used directly for the application or purpose for which the output was generated.

In one aspect, we may select any $r_1$-$r_k$ random number outputs for seeding the APRNG in the subsequent iterations. For example, a user or automated process can select various groupings in $r_1$-$r_k$, such as, the values in the first position ($r_1$), last position ($r_k$), middle position ($r_{middle}$), etc. as shown in the sorting step 150 in FIG. 1. These groupings of random numbers can then be concatenated in any order, thereby creating the subsequent seed number as input to the APRNG.

In another aspect, the seed can be generated by selecting and concatenating individual digits from various positions of the BNG output. The APRNG is aperiodic because the step counter X in the BNG formula above increases exponentially towards infinity.

Figure 2:
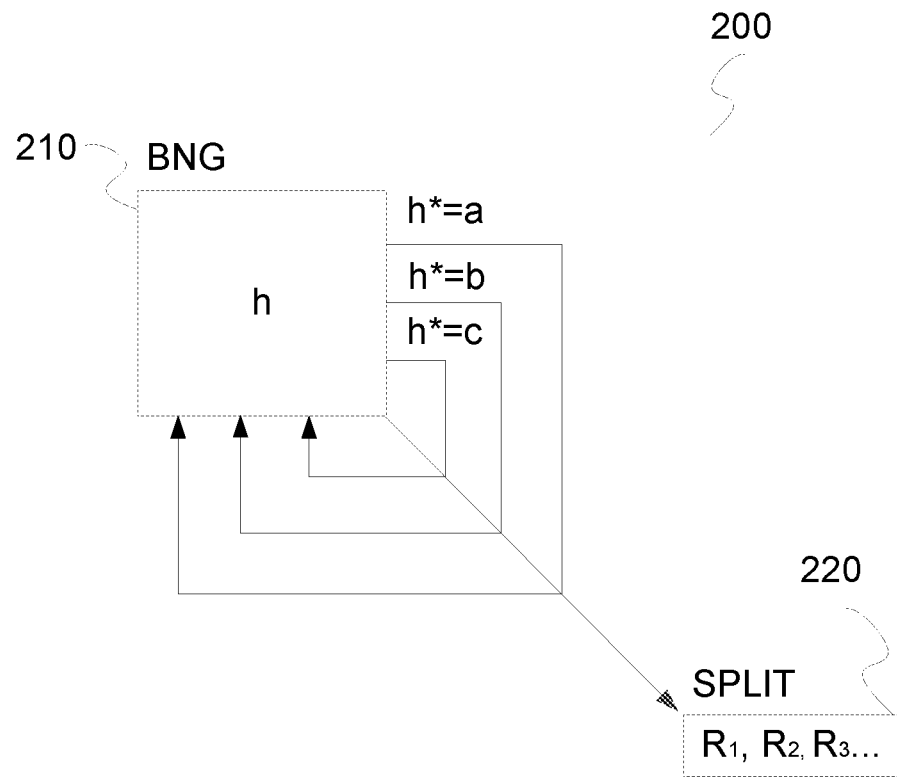
FIG. 2 shows a 2nd Exemplary Embodiment of the APRNG.

2nd Embodiment of the APRNG:

FIG. 2 shows a 2nd Exemplary Embodiment of the APRNG. Referring to FIG. 2, in a second embodiment of the APRNG 200, a large random number h is generated and used to seed the APRNG. The large random number h can be generated, for example, by taking three separate readings (a, b, c) of the computer clock and multiplying the three numbers (a, b, c) to arrive at h. Alternatively, the values of a, b, c can be concatenated to obtain h. The values of a, b, c can also be obtained from any automated process or source (or may be entered by the user). The values of a, b, and c can be selected to be any number of 7 or more digits (e.g., 100 digits).

In this embodiment, a BNG 210 generates large random numbers $h_0$-$h_n$ utilizing the following multiplication scheme:

$$h_0 = a*b*c$$

$$h_1 = h_0*a$$

$$h_2 = h_1*b$$

$$h_3 = h_2*c$$

$$h = h_3*a \qquad \text{Equation (4)}$$

Each large random number h that is generated is utilized in the subsequent iteration to generate the subsequent large random number $h_{n+1}$. Specifically, the initial large random number, $h_0$, is generated by multiplying a, b, and c. The next large random number, $h_1$, is generated by multiplying the previous value $h_0$ by a. The next large random number, $h_2$, is generated by multiplying the previous value $h_1$ by b. The next large random number, $h_3$, is generated by multiplying the previous value $h_2$ by c. This process is repeated, using numbers a, b, c, respectively, with each iteration, until the desired number of random numbers is obtained. In one aspect a, b, c are used in this order in every iteration, while in another aspect their order is changed between iterations for adding extra randomness to the APRNG output. While the order of a, b, c may change between iteration, their values remain constant.

Each large random number $h_n$ that is generated (i.e., $h_0$, $h_1$, $h_2$, ... $h_n$) can be split 220 into smaller groups of random numbers (i.e. $r_1$, $r_2$, $r_3$ ... $r_n$), in the same manner discussed above in connection with the 1$^{st}$ exemplary embodiment, and used directly for the application or purpose for which the output was generated.

This embodiment of the APRNG is aperiodic as the number $h_n$ increases towards infinity.

Figure 3:
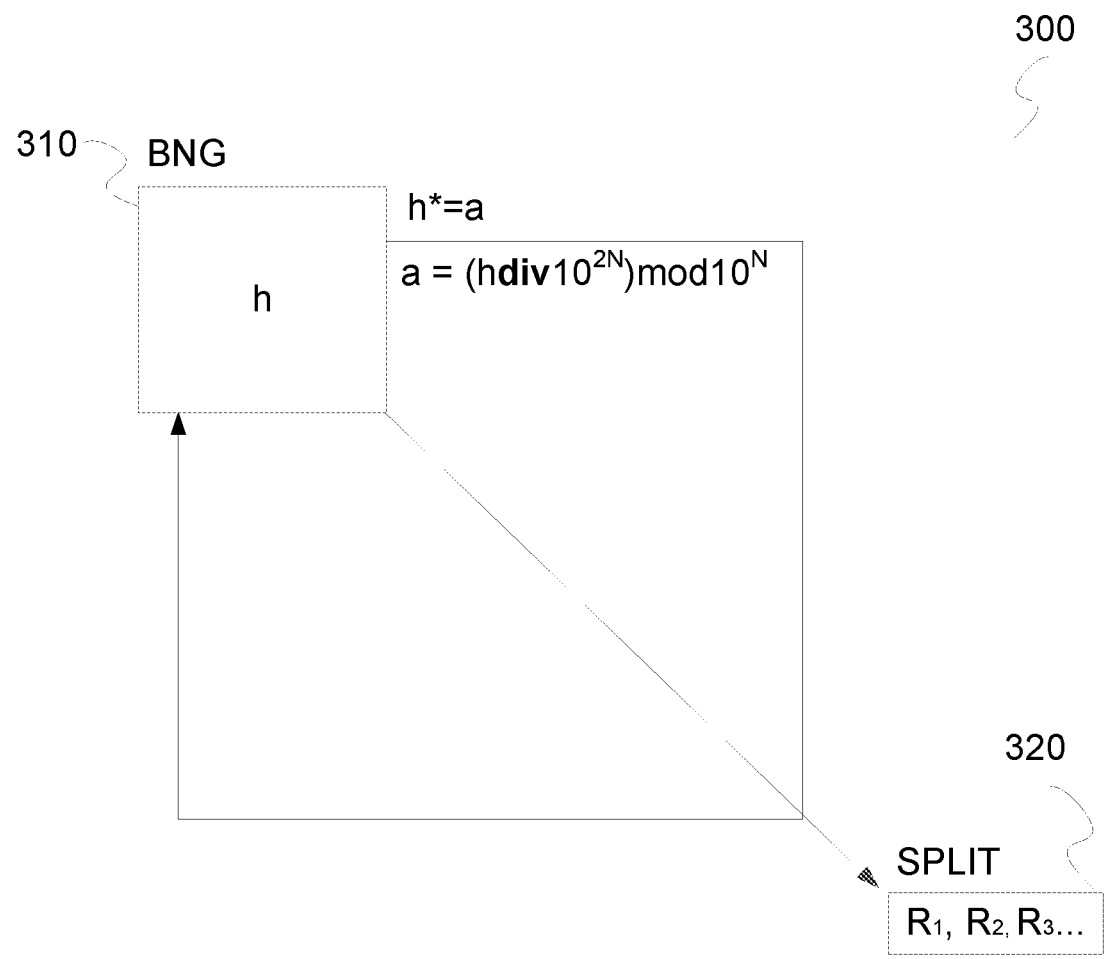
FIG. 3 shows a $3^{rd}$ Exemplary Embodiment of the APRNG.

3rd Embodiment of the APRNG:

FIG. 3 shows a 3$^{rd}$ Exemplary Embodiment of the APRNG. Referring to FIG. 3, APRNG 300 uses a BNG 310 which can generate a large random number h that is used to seed the APRNG. The large random number h can be generated, for example, by taking three separate readings (a, b, c) of the computer clock and multiplying the three numbers (a, b, c) to arrive at h=a*b*c.

Alternatively, the values of a, b, c can be concatenated to obtain h=(ab). The values of a, b, c can also be obtained from any automated process or source (e.g. a computer clock or other). The value of a, b, and c can be selected to be any number of 7 or more digits (e.g., 100 digits).

In this embodiment, the BNG shown in FIG. 3 generates large random numbers $h_0$-$h_n$ utilizing the following scheme.

$$h_0 = a*b*c$$

$h_1 = h_0*a'$, where $a'=(h_0 \text{ div } 10^{2N})\text{mod } 10^N$, and
$N$=number of digits in $a$ $h_2 = h_1*a''$, where $a''=(h_1 \text{ div } 10^{2N})\text{mod } 10^N$, and
$N$=number of digits in $a'$ $h_n = h_{n-1}*a_k$, where $a_k=(h_{n-1} \text{ div } 10^{2N})\text{mod } 10^N$, and
$N$=number of digits in $a_{k-1}$ $\qquad$ Equation (5)

Each large random number $h_n$ that is generated is used in the subsequent iteration to generate the subsequent large random number $h_{n+1}$. Specifically, the initial large random number, $h_0$, is generated by multiplying a, b, and c. The next large random number, $h_1$, is generated by multiplying the previous large random number $h_0$ by a', which is obtained by the formula: $a'=(h_0 \text{ div } 10^{2N})\text{mod } 10^N$, where N is the number of digits in a. The next large random number, $h_2$, is generated by multiplying the previous large random number $h_1$ by a'', which is obtained by a''=$(h_1 \text{ div } 10^{2N})\text{mod } 10^N$, where N is the number of digits in a'. This process is repeated until the desired number of random numbers is obtained.

Each large random number h, that is generated (i.e. $h_0$, $h_1$, $h_2$, ..., $h_n$) can be split 320 into smaller groups of random numbers (i.e. $r_1$, $r_2$, $r_3$ ... $r_n$), in the same manner discussed above in connection with the 1$^{st}$ exemplary embodiment, and used directly for the application or purpose for which the output was generated.

Alternatively, a' can be generated by selecting digits from various positions of $h_{n-1}$, or by aggregating various groupings in $r_{1-m}$, such as, the values in the first position ($r_1$), last position ($r_k$), middle position ($r_{middle}$), etc. These groupings of random numbers can then be concatenated thereby creating the subsequent a'.

This embodiment of the APRNG is aperiodic as the number h increases towards infinity.

4th Embodiment of the APRNG:

The 4$^{th}$ embodiment is a variation of the 3$^{rd}$ embodiment, where the multiplication of each digit of h with each digit of a is replaced with an XOR operation.

Methodology of the Operation of the APRNG

The APRNG may be implemented in software, hardware, firmware or a combination of the previous. Considering an example hardware architecture, a micro-chip implements long multiplication (i.e. the "vertical" multiplication of two numbers using partial multiplication results of a first number with each digit of a second number, and adding the partial results—each partial result is misaligned with respect to the partial result above it by a 1-digit position—to derive the final multiplication result) in hardware and/or in software for various integer and floating-point word (i.e. number) sizes. In arbitrary-precision arithmetic, the exemplary micro-chip uses long multiplication with the base set to 2, where w is the number of bits in a word, for multiplying relatively small numbers.

To multiply two numbers h (with n digits) and a (with N digits) to produce subsequently the next h (with n+N−1 up to n+N digits) using the long multiplication method in the exemplary embodiments above, the micro-chip implementing the APRNG needs about (n*N)+z operations for the next subsequent result number h (z is for adding the partial results) plus n+N−1 steps for splitting the number h to groups of one digit. So, the general time complexity is:

$$O(n*N+n+N-1) \text{ up to } O(n*N+n+N)$$

Therefore, the time complexity until the microchip produces the first random number is $$O(n*N+n+N-1+(i-1)) \text{ up to } O(n*N+n+N+(i-1))$$

where i denotes the iteration and starts from the value of "1".

The goal is to minimize the time complexity of the calculations in the above exemplary embodiments from $$O(n*N+n+N+(i-1)) \text{ to } O(1)$$

for each random number.

Figure 4:
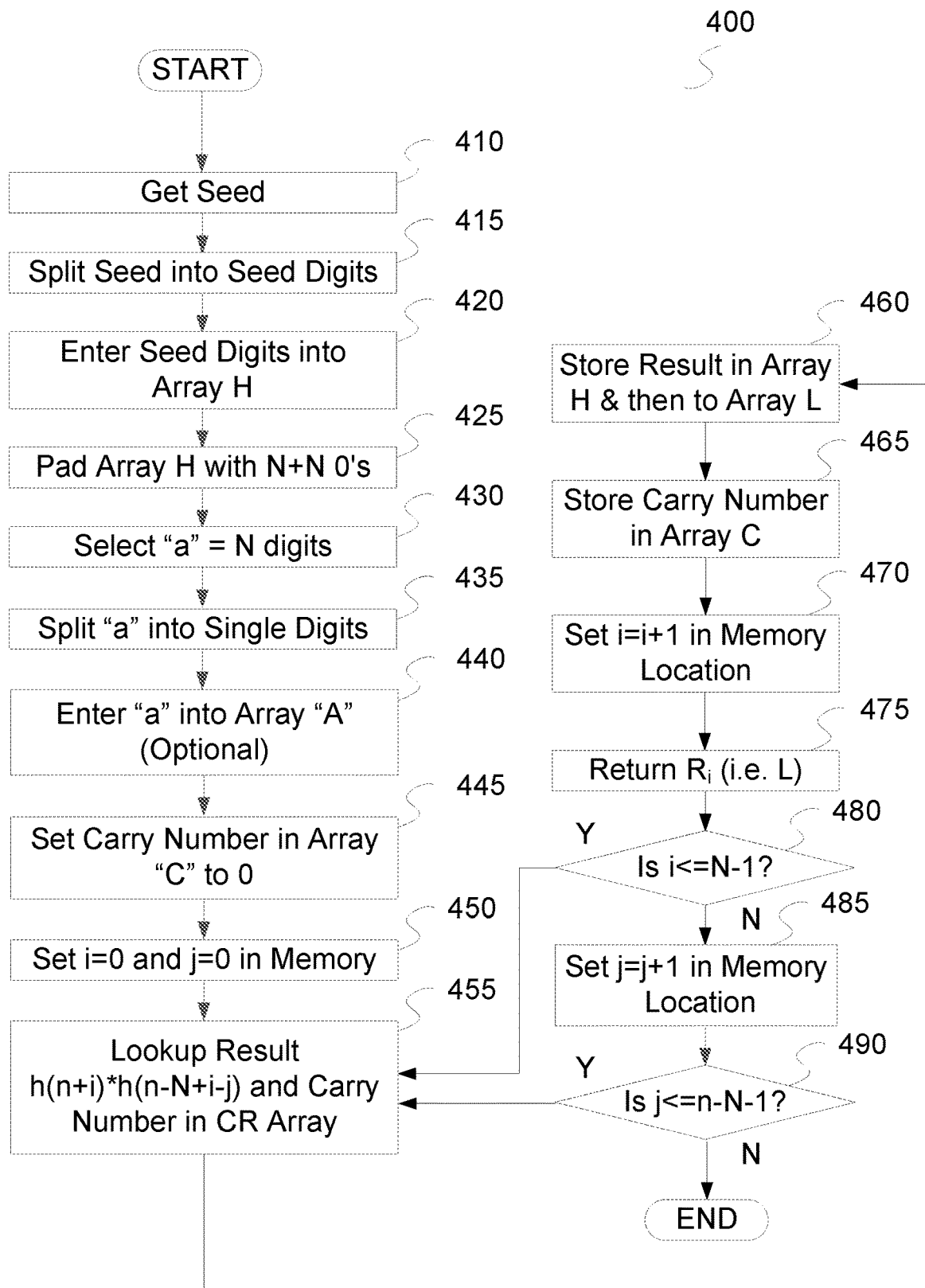
FIG. 4 shows a flowchart of a methodology for creating a pseudo random number with the present APRNG.

1$^{st}$ Simplification for the Reduction of the APRNG Complexity in Calculations:

FIG. 4 shows a flowchart of a methodology for creating a pseudo random number with the present APRNG.

We assume the following example, where:

h=803,729,152 a=729

Initially a first huge seed number h is selected 410, split into single digits 415, and stored in an array 420 with length equal to n=length(h), as shown in the example below. For simplicity in the illustration, h is shown to have only 9 digits:

| h = | 8 | 0 | 3 | 7 | 2 | 9 | 1 | 5 | 2 |
|---|---|---|---|---|---|---|---|---|---|

The number a in this example has length N=3 digits, so in array h we will add [N]=3 zero cells at the end and [N]=3 zero cells at the beginning 525, as follows:

| h = | 0 | 0 | 0 | 8 | 0 | 3 | 7 | 2 | 9 | 1 | 5 | 2 | 0 | 0 | 0 |
|---|---|---|---|---|---|---|---|---|---|---|---|---|---|---|---|

The 3rd zero cell at the end of h is used in the manipulation of tables (refer to the paragraph "Implementing the Tables").

a is then selected 430, split into single digits 435 and optionally entered into an array A 440.

And now we can computationally shorten operations to local places by making the algorithm more efficient at speed, performing for each one-digit random number and its corresponding multiplications, a total number of operations reduced to O (1) time complexity. A carry bit c is set to 0 in an array C 445 and a set of counters i, j are set to 0 in memory 450.

The multiplications between the padded h and the number a are calculated as shown in Table 1. In practice the multiplications in Table 1 are implemented as a series of lookup operations for the result and the associated carry number in a table that holds all the possible results and carry numbers (this is explained in detail later in the description where the use of arrays is presented).

TABLE 1

Multiplication of h * a

Multiplication

| 0 | 0 | 0 | 8 | 0 | 3 | 7 | 2 | 9 | 1 | 5 | 2 | 0 | 0 | 0 | |
|---|---|---|---|---|---|---|---|---|---|---|---|---|---|---|---|
|   |   |   |   |   |   |   |   |   |   |   | 7 | 2 | 9 | = 14 + 0 + 0 + 0 = 14 |
|   |   |   |   |   |   |   |   |   |   | 7 | 2 | 9 |   | = 35 + 4 + 0 + 1 = 40 |
|   |   |   |   |   |   |   |   |   | 7 | 2 | 9 |   |   | = 7 + 10 + 18 + 4 = 39 |
|   |   |   |   |   |   |   |   | 7 | 2 | 9 |   |   |   | = 63 + 2 + 45 + 3 = 113 |
|   |   |   |   |   |   |   | 7 | 2 | 9 |   |   |   |   | = 14 + 18 + 9 + 11 = 52 |
|   |   |   |   |   |   | 7 | 2 | 9 |   |   |   |   |   | = 49 + 4 + 81 + 5 = 139 |
|   |   |   |   |   | 7 | 2 | 9 |   |   |   |   |   |   | = 21 + 14 + 18 + 13 = 66 |
|   |   |   |   | 7 | 2 | 9 |   |   |   |   |   |   |   | = 0 + 6 + 63 + 6 = 75 |
|   |   |   | 7 | 2 | 9 |   |   |   |   |   |   |   |   | = 56 + 0 + 27 + 7 = 90 |
|   |   | 7 | 2 | 9 |   |   |   |   |   |   |   |   |   | = 0 + 16 + 0 + 9 = 25 |
|   | 7 | 2 | 9 |   |   |   |   |   |   |   |   |   |   | = 0 + 0 + 72 + 2 = 74 |
| 7 | 2 | 9 |   |   |   |   |   |   |   |   |   |   |   | = 0 + 0 + 0 + 7 = 7 |

The random sequence of single digits that are extracted are: R={4, 0, 9, 3, 2, 9, 6, 5, 0, 5, 4, 7} which we can group according to our choice, e.g.: in two-digit random numbers: R={40, 93, 29, 65, 5, 47}, or three-digit random numbers: R={409, 329, 650, 547}, etc.

Taking a closer look to how R is produced, we start by taking as the initial seed a large number $h_0$ and enter it in a table 1×n, that is, we break $h_0$ in its digits and fill the cells of the table with its digits, as in the example:

| h = | 8 | 0 | 3 | 7 | 2 | 9 | 1 | 5 | 2 |
|---|---|---|---|---|---|---|---|---|---|

Then we use the length N of the number a to choose from h[N] up to h[2*N−1] cell of array h, but based on the above example, for more efficient speed, we will place N zero cells at the beginning of array h and N zero cells in end of array h. So the new cell sorting will be from h[2*N] up to h[3*N−1] based on the new extension of array h:

| h = | 0 | 0 | 0 | 8 | 0 | 3 | 7 | 2 | 9 | 1 | 5 | 2 | 0 | 0 | 0 |
|---|---|---|---|---|---|---|---|---|---|---|---|---|---|---|---|

Then the algorithmic operations and steps (from FIG. 4) to produce the random numbers R1, R2, . . . are:

$C_0=0$ $R_1=(h[6]*h[-3]+h[7]*h[-2]+h[8]*h[-1]+C_0) \bmod 10$ $C_1=R_1//10$ $R_2=(h[6]*h[-4]+h[7]*h[-3]+h[8]*h[-2]+C_1) \bmod 10$ $C_2=R_2//10$ $R_3=(h[6]*h[-5]+h[7]*h[-4]+h[8]*h[-3]+C_2) \bmod 10$ $C_3=R_3//10$ $R_4=(h[6]*h[-6]+h[7]*h[-5]+h[8]*h[-4]+C_3) \bmod 10$ $C_4=R_4//10$ $R_5=(h[6]*h[-7]+h[7]*h[-6]+h[8]*h[-5]+C_4) \bmod 10$ $C_5=R_5//10$ $R_6=(h[6]*h[-8]+h[7]*h[-7]+h[8]*h[-6]+C_5) \bmod 10$ $C_6=R_6//10$ $R_7=(h[6]*h[-9]+h[7]*h[-8]+h[8]*h[-7]+C) \bmod 10$ $C_7=R_7//10$ $R_8=(h[6]*h[-10]+h[7]*h[-9]+h[8]*h[-8]+C_7) \bmod 10$ $C_8=R_6//10$ $R_9=(h[6]*h[-11]+h[7]*h[-10]+h[8]*h[-9]+C_8) \bmod 10$ $C_9=R_9//10$ $R_{10}=(h[6]*h[-12]+h[7]*h[-11]+h[8]*h[-10]+C_9) \bmod 10$ $C_{10}=R_{10}//10$ $R_{11}=(h[6]*h[-13]+h[7]*h[-12]+h[8]*h[-11]+C_{10}) \bmod 10$ $C_{11}=R_{11}//10$ $R_{12}=(h[6]*h[-14]+h[7]*h[-13]+h[8]*h[-12]+C) \bmod 10$ where:
$R_i$=$i^{th}$ Random number
h[i]=Specific cell in the array h, with one-digit integer
$C_0$=Seed
$C_{i-1}$=Carry from previous step operation.
$R_i$=h[2*N]*h[−i−N+1]+h[2*N+1]*h[−i−N+2]+ . . . +h[3*N−1]*h[−i]+Ci-1
// is the div operator The resulting pseudo random numbers are then stored 460 and so is the carry number 465. The i counter is increased by 1 between each iteration 470 and the result is returned 475 until i<=N−1 480 or the counter is increased by 1 485 until i<=n−N−1 and the result is calculated simply by a look up operation at a table holding all the possible results and carry numbers 455.

2nd Simplification for the Reduction of the APRNG Complexity in Calculations:

We can perform the operations of multiplication from the 1st simplification example, using the Multiplication Table (M) shown in Table 2:

TABLE 2

Multiplication Table (M) for decimal, single digit numbers.

| M | 0 | 1 | 2 | 3 | 4 | 5 | 6 | 7 | 8 | 9 |
|---|---|---|---|---|---|---|---|---|---|---|
| 0 | 0 | 0 | 0 | 0 | 0 | 0 | 0 | 0 | 0 | 0 |
| 1 | 0 | 1 | 2 | 3 | 4 | 5 | 6 | 7 | 8 | 9 |
| 2 | 0 | 2 | 4 | 6 | 8 | 10 | 12 | 14 | 16 | 18 |
| 3 | 0 | 3 | 6 | 9 | 12 | 15 | 18 | 21 | 24 | 27 |
| 4 | 0 | 4 | 8 | 12 | 16 | 20 | 24 | 28 | 32 | 36 |
| 5 | 0 | 5 | 10 | 15 | 20 | 25 | 30 | 35 | 40 | 45 |
| 6 | 0 | 6 | 12 | 18 | 24 | 30 | 36 | 42 | 48 | 54 |
| 7 | 0 | 7 | 14 | 21 | 28 | 35 | 42 | 49 | 56 | 63 |
| 8 | 0 | 8 | 16 | 24 | 32 | 40 | 48 | 56 | 64 | 72 |
| 9 | 0 | 9 | 18 | 27 | 36 | 45 | 54 | 63 | 72 | 81 |

For example, if we want to multiply 7×9, we don't need to calculate the multiplication operation. Instead, we can simply look up the value stored in the cell indexed by the 7th row and 9th column in the multiplication table M: M[7,9]=63

Then the more efficient algorithmic operations and steps from the previous 1 simplification example to produce the random numbers $R_1, R_2, \ldots$ using table M are:

$$C_0=0$$

$$R_1=(M[h[6],h[-3]]+M[h[7],h[-2]]+M[h[8],h[-1]]+C_0) \bmod 10$$

$$C_1=R_1//10$$

$$R_2=(M[h[6],h[-4]]+M[h[7],h[-3]]+M[h[8],h[-2]]+C_1) \bmod 10$$

$$C_2=R_2//10$$

$$R_3=(M[h[6],h[-5]]+M[h[7],h[-4]]+M[h[8],h[-3]]+C_2) \bmod 10$$

$$C_3=R_3//10$$

$$R_4=(M[h[6],h[-6]]+M[h[7],h[-5]]+M[h[8],h_1[-4]]+C_3) \bmod 10$$

$$C_4=R_4//10$$

$$R_5=(M[h[6],h[-7]]+M[h[7],h[-6]]+M[h[8],h_1[-5]]+C_4) \bmod 10$$

$$C_5=R_5//10$$

$$R_6=(M[h[6],h[-8]]+M[h[7],h[-7]]+M[h[8],h[-6]]+C_5) \bmod 10$$

$$C_6=R_6//10$$

$$R_7=(M[h[6],h[-9]]+M[h[7],h[-8]]+M[h[8],h[-7]]+C_6) \bmod 10$$

$$C_7=R_7//10$$

$$R_8=(M[h[6],h[-10]]+M[h[7],h[-9]]+M[h[8],h[-8]]+C_7) \bmod 10$$

$$C_8=R_8//10$$

$$R_9=(M[h[6],h[-11]]+M[h[7],h[-10]]+M[h[8],h[-9]]+C) \bmod 10$$

$$C_9=R_9//10$$

$$R_{10}=(M[h[6],h[-12]]+M[h[7],h[-11]]+M[h[8],h[-10]]+C_9) \bmod 10$$

$$C_{10}=R_{10}//10$$

$$R_{11}=(M[h[6],h[-13]]+M[h[7],h[-12]]+M[h[8],h[-11]]+C_{10}) \bmod 10$$

$$C_{11}=R_{11}//10$$

$$R_{12}=(M[h[6],h[-14]]+M[h[7],h[-13]]+M[h[8],h[-12]]+C_{11}) \bmod 10$$

where:
$C_{i-1}=R_{i-1}//10$
$R_i=(M[h[2*N],h[-i-N+1]]+M[h[2*N+1],h[-i-N+2]]+ \ldots +M[h[3*N-1],h[-i]]+C-1) \bmod 10$
// is the div operator Then we can also build a two-dimensional Carry-Random (CR) board with all possible C, carry values, and random R numbers, so that we have direct access to the separate values without calculating them with mod and div operations. In the present example, the table will have as many cells as the formula:

$$N*9*9+25 =>N*81+24$$

where:
9*9=81 is the largest number length used in the multiplication
N=Length (a)=3 based on the example above in Table 1.
24=the number of possible carries from the previous multiplication is 1 . . . 24
Therefore, for N=3=>3*81+24=267 cells:

TABLE 3

Table (CR) holding all possible carry (C) and single digit decimal numbers (R).

| CR | 0 | 1 | 2 | 3 | 4 | 5 | 6 | 7 | 8 | 9 | 10 | 11 | 12 | ... | 264 | 265 | 266 | 267 |
|----|---|---|---|---|---|---|---|---|---|---|----|----|----|-----|-----|-----|-----|-----|
| 0 | 0 | 0 | 0 | 0 | 0 | 0 | 0 | 0 | 0 | 0 | 1 | 1 | 1 | ... | 26 | 26 | 26 | 26 |
| 1 | 0 | 1 | 2 | 3 | 4 | 5 | 6 | 7 | 8 | 9 | 0 | 1 | 2 | ... | 4 | 5 | 6 | 7 |

The CR table can be extended for the maximum number of 7 digits for a, thus creating a CR table of length: 7*81+56=623 cells. In one aspect, the exemplary embodiment always uses the extended CR table regardless of the length of a. This way the CR table is created once and used for all lengths of a.

The first line of the CR Table refers to carry values (C) and the second line refers to RNG values (R).

So, by simplifying and replacing the previous mod and div operations with the values from the CR table, we have:

$$C_0=0$$

$$R_1=CR[1,(M[h[6],h[-3]]+M[h[7],h[-2]]+M[h[8],h[-1]]+C_0)=r_1]$$

$$C_1=CR[0,r_1]$$

$R_2=CR[1,(M[h[6],h[-4]]+M[h[7],h[-3]]+M[h[8],h[-2]]+C_1)=r_2]$ $C_2=CR[0,r_2]$ $R_3=CR[1,(M[h[6],h[-5]]+M[h[7],h[-4]]+M[h[8],h[-3]]+C_2)=r_3]$ $C_3=CR[0,r_3]$ $R_4=CR[1,(M[h[6],h[-6]]+M[h[7],h[-5]]+M[h[8],h[-4]]+C_3)=r_4]$ $C_4=CR[0,r_4]$ $R_5=CR[1,(M[h[6],h[-7]]+M[h[7],h[-6]]+M[h[8],h[-5]]+C_4)=r_5]$ $C_5=CR[0,r_5]$ $R_6=CR[1,(M[h[6],h[-8]]+M[h[7],h[-7]]+M[h[8],h[-6]]+C_5)=r_6]$ $C_6=CR[0,r_6]$ $R_7=CR[1,(M[h[6],h[-9]]+M[h[7],h[-8]]+M[h[8],h[-7]]+C_6)=r_7]$ $C_7=CR[0,r_7]$ $R_8=CR[1,(M[h[6],h[-10]]+M[h[7],h[-9]]+M[h[8],h[-8]]+C_7)=r_8]$ $C_8=CR[0,r_8]$ $R_9=CR[0,(M[h[6],h[-11]]+M[h[7],h[-10]]+M[h[8],h[-9]]+C)=r_9]$ $C_9=CR[0,r_9]$ $R_{10}=CR[1,(M[h[6],h[-12]]+M[h[7],h[-11]]+M[h[8],h[-10]])=r_{10}]$ $C_{10}=CR[0,r_{10}]$ $R_{11}=CR[1,(M[h[6],h[-13]]+M[h[7],h[-12]]+M[h[8],h[-11]]+C_{10})=r_{11}]$ $C_{11}=CR[0,r_{11}]$ $R_{12}=CR[1,(M[h[6],h[-14]]+M[h[7],h[-13]]+M[h[8],h[-12]]+C)=r_{12}]$ where:
$C_{i-1}=CR[0, r_{i-1}]$
$R_i=CR[1,(M[h[2*N],h[-i-N+1]]+M[h[2*N+1],h[-i-N+2]]+ \ldots +M[h[3*N-1],h[-i]]+C_{i-1})=r_i]$
$r_i$=the index of a column of the CR table Therefore, all that is needed to generate the PRN in the present example is to look up the carry numbers in the first line of the CR table and the PRN numbers in the second row of the CR table.

As a result the above solution has achieved to replace all multiplications, div and mod operators which are computationally intensive, with the much simpler operations of looking up separate values in a table and adding these values to each other, effectively reducing the order of complexity in the generation of the PRNs and allowing the PRNs to be computed faster even on processors with low processing power and available memory.

In a modification of the present exemplary embodiment, the 2-dimensional CR array is replaced by 2 one-dimensional arrays. The first such array, C, holds the carry values c and the second array, R holds the pseudo random number values, R.

Figure 12:
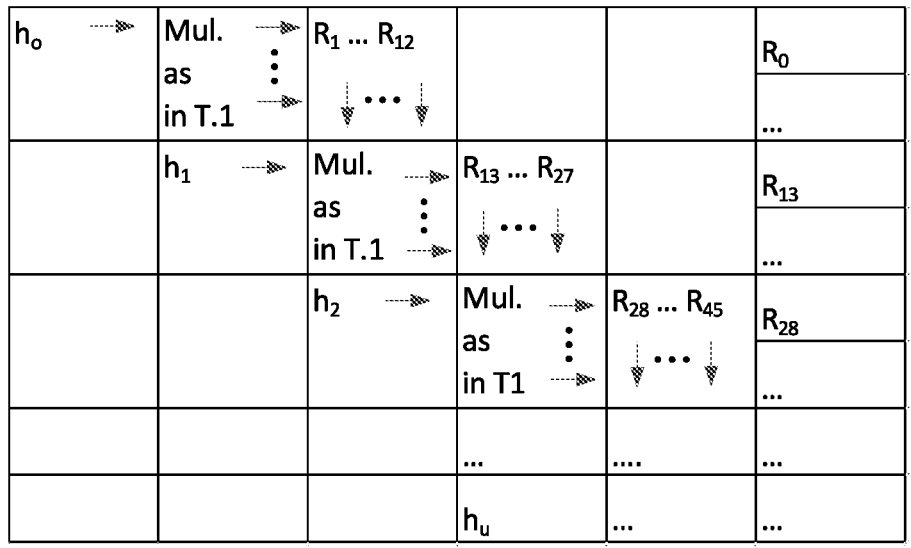
FIG. 12 illustrates a Table 4 showing multiplications for the creation of a sequence of random numbers.

Repeating the above simplification operations, one can produce a sequence of pseudo random numbers as shown in Table 4 illustrated in FIG. 12, repeatedly creating multiplications like in Table 1.

Figure 13:
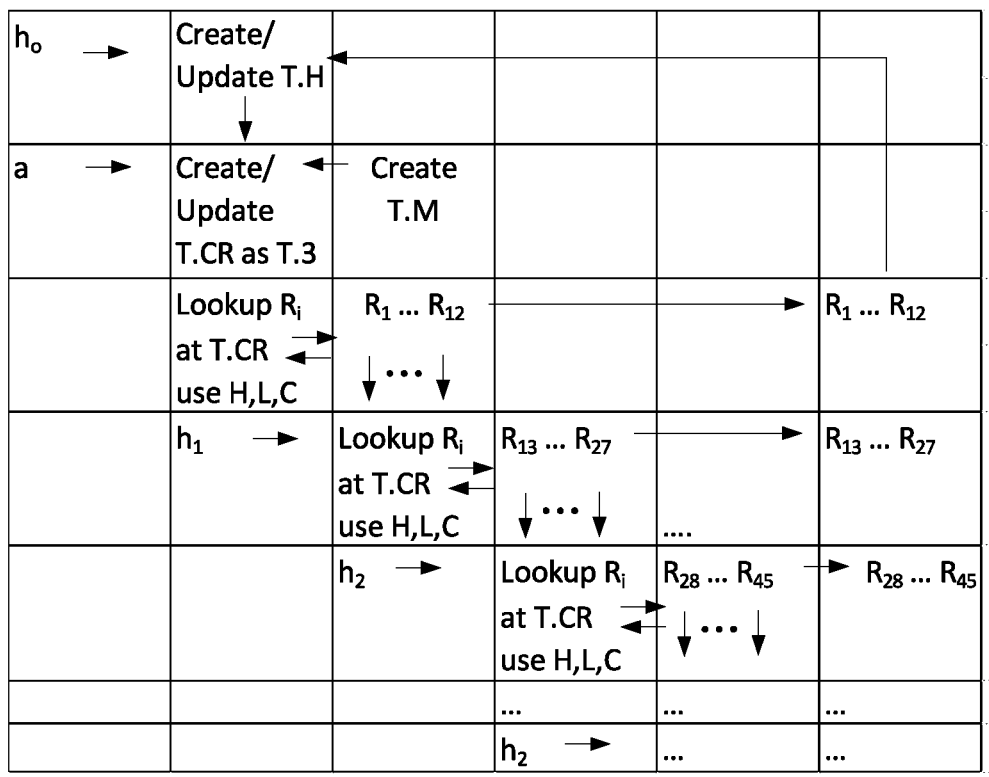
FIG. 13 illustrates a Table 5 showing the simplification of the multiplications for the creation of a sequence of random numbers.

Table 5 illustrated in FIG. 13 shows how the multiplications of Table 4 can be simplified using CR result tables like in Table 3 for producing a sequence of pseudo random numbers. The process starts with the selection of a seed $h_0=0$ 410, splitting it into single digits 415, and storing it in a table H 420 and then padding it with 0's 425. A number a is chosen 430 by the user or by an automated process (e.g. from the computer clock), split into single digits 435, and (optionally) entered into an array A 440. A table M is created containing all the multiplication results of all decimal single-digit numbers [1 . . . 9]. H and a are used together with M to create the CR table holding all possible random numbers $R_i$ and all possible carry numbers c for the $R_i$. The first carry number is set to "0" 445. To create a pseudo random number $R_i$, all that is needed is to use a seed $h_0$ (after the first iteration the previous h, $h_{i-1}$, becomes the seed) and stored in array H, and look it up at the CR table 455 (with the help of counters i, j [steps 450-490] that are initially set to 0). For each random number $R_i$ its digits are each calculated (i.e. the digits of the $h_i$ produced by the lookup operation at the CR table) and stored in array H 460 from the end to the beginning as they are computed. The carry bit $c_i$ is stored in array C 465. Having filled array H with an $h_i$, each digit in H is copied to an array L 460 in their correct order to form the pseudo random number $R_i$ which is returned for use 475. The pseudo random numbers are then used in any application needing random numbers and (optionally) used to seed to APRN to calculate new random numbers. In one aspect the pseudo random numbers are stored in a 2D array holding a sequence of pseudo random numbers, e.g. for testing or other operations.

Table 4 in FIG. 12 shows the multiplications. needed for the creation of a sequence of random numbers with the APRNG. "Mul." stands for "Multiplications" and "T." for "Table".

Table 5 in FIG. 13 shows the simplification of the multiplications needed for the creation of a sequence of random numbers with the APRNG. "T." stands for "Table".

Implementing the Tables

To implement the above process of RNG calculation we need to create 5 arrays:
- CR (2×623 max), in which all possible C carry numbers are stored in the first line of CR array and all R random numbers in the second line, so that we have direct access without performing the mod and div operations. Smaller CR tables can be used for smaller a (refer to Table 3)
- M (10×10), in which all possible results from one-to-one multiplications are stored, so that we have direct access to the results, without execution (refer to Table 2)
- A (1×N), in which the digits of a are stored. A is optional as a is a part of h (refer to Table 1)
- H (1×N), in which the calculated digits (triplet) of the number h (multiplied with the N=3 digits of a) will be stored from the end to the beginning with a time delay, after each of the mathematical operations (multiplication of each row) based on (Table 1)
- L (1×N) (i.e. 3-7, 3 in the present example) in which the calculated digits of the number h will be stored after its mathematical operations (refer to Table 1)

C (1×1), in which single-cell array, the carry bit ci is stored.

Flowchart of the Operation of the APRNG

FIG. 4 shows a flowchart of a methodology for creating a pseudo random number with the present APRNG. The generation of the PRN sequence by the APRNG 400 starts with getting a seed 410 either from the user typing it or verbally entering it, or by an automatic process such as a process accessing the computer clock or some external clock or other source. The seed is divided 420 into single digits and the digits are entered into an array H 420 stored either in local or remote memory. Array H is padded 425 with N 0's at the beginning and N 0's at the end. "a" is selected 430 from the array H using some rule or randomly, is split into single digits 435 and (optionally) entered into array A 440. The contents of array C are set to 0 445, effectively setting the initial seed to 0.

Parameters i and j are each set to "0" 450 in a memory location, respectively. The process continues with looking up 455 the result of the product of h(n+i)*h(n−N+i−j) in Array M, and the returned value is stored in array L 460. Parameter i is increased by a count of 1 470 at the memory location where it is stored and until the i reaches the maximum value of N−1 480, the result is returned 475 and the process branches back to step 455 where it looks up the result h(n+i)*h(n−N+i−j) in Array M.

Upon parameter i reaching the maximum value of N−1 480, the process looks up the PRN R in array CR 455 and returns R 475 for use in any application. The process continues with looking up carry bit c in array CR 455 and increasing parameter j by a count of 1 485 at the memory location where it is stored. Until j reaches the maximum value n−N−1 490 the process branches back to the step where it looks up the result h(n+i)*h(n−N+i−j) in Array M 455. Upon parameter j reaching the maximum value of n−N−1 490, the process ends.

Algorithmic Implementation of the Calculations of Table 1

First, we take the number $h_0$ as a seed and separate it into its individual digits, which we store in an array H. Then we increase array H to the left and right with N zero cells, i.e. as many as the digits of the multiplier a (a is part of the number-array H). Subsequently:

for i=1 and U[0]=C0=0 we perform the operation:

$$r_1 = (h[6]*h[-4] + h[7]*h[-3] + h[8]*h[-2] + U[0])$$

$R_1 = r_1$ mod 10 for the pseudo-random number and $C_1 = r_1$ div 10 for the carry.

Then we assign the cell L[−imod 3]=L[−1 mod 3]=L[−1] to h[−i]=h[−1] and $R_1$ is assigned to cell L[−1] and $C_1$ is assigned to cell U[0].

for i=2 we perform the operation:

$$r_2 = (h[6]*h[-5] + h[7]*h[-4] + h[8]*h[-3] + U[0])$$

$R_2 = r_2$ mod 10 for the pseudo-random number και $C_2 = r_2$ div 10 for the carry.

Then we assign the cell L[−imod 3]=L[−2 mod 3]=L[−2] to h[−i]=h[−2] and $R_2$ is assigned to cell L[−2] and $C_2$ is assigned to cell U[0].

for i=3 we perform the operation:

$$r_3 = (h[6]*h[-6] + h[7]*h[-5] + h[8]*h[-4] + U[0])$$

$R_3 = r_3$ mod 10 for the pseudo-random number και $C_3 = r_3$ div 10 for the carry.

Then we assign the cell L[−imod 3]=L[−3 mod 3]=L[0] to h[−i]=h[−3] and $R_3$ is assigned to cell L[0] and C3 is assigned to cell U[0].

for i=4 we perform the operation:

$$r_4 = (h[6]*h[-7] + h[7]*h[-6] + h[8]*h[-5] + U[0])$$

$R_4 = r_4$ mod 10 for the pseudo-random number και $C_4 = r_4$ div 10 for the carry.

Then we assign the cell L[−imod 3] L[−4 mod 3]=L[−1] to h[−i]=h[−4] and $R_4$ is assigned to cell L[−1] and $C_4$ is assigned to cell U[0].

for i=11 we perform the operation:

$$r_{11} = (h[6]*h[-14] + h[7]*h[-13] + h[8]*h[-12] + U[0])$$

$R_{11} = r_{11}$ mod 10 for the pseudo-random number και $C_{11} = r_{11}$ div 10 for the carry.

Then we assign the cell L[−imod 3]=L[−11 mod 3]=L[−1] to h[−i]=h[−11] and $R_{11}$ is assigned to cell L[−1] and $C_{11}$ is assigned to cell U[0].

for i=12 we perform the operation:

$$r_{12} = (h[6]*h[-15] + h[7]*h[-14] + h[8]*h[-13] + U[0]) \text{ mod } 10$$

$R_{12} = r_{12}$ mod 10 for the last pseudo-random number. Then we assign the cell L[−imod 3]=L[−12 mod 3]=L[0] to h[−i]=h[−12] and $R_{12}$ is assigned to cell L[0] and $C_{12}$ is assigned to cell U[0] and U[0] is assigned to cell h[−13].

---

Fortran Pseudo-code Implementation of the calculations of Table 1

```
Program APRNG
Implicit None
interface
    Integer , dimension(1) :: U
    Integer , dimension (N) :: L
    Integer , dimension, (:) :: h
    Integer :: i , j , r , R , C
End interface
U[0] = 0
L = [0]*N
Do i = 1 to len(h): # Loop
    r = (h[6]* h[-i-3] + h[7]* h[-i-2] + h[8]* h[-i-1] + U[0])
# Total operation product
    R = r %10 # Pseudo-random number produced with mod10 operation
    C = R//10 # Carry for the next operation product produced with div10 operation
        U[0] = C # Carry to the array U[0].
        h[-1] = L[-i%3] # The digit in the array L assigned to the position -i to the array h.
        L[-i%3] = R # The digit in the array R assigned to the position - imod3 to the array L.
    Print*, R
    end Do
    end Program APRNG
```

---

Fortran Pseudo-code Implementation of the calculations of Table 4

```
Program APRNG
Implicit None
interface
    Integer , dimension (1) :: U
    Integer , dimension (N) :: L
    Integer , dimension (:) :: h
    Integer :: i , j , r , R , C , A
End interface
U[0] = 0
L = [0]*N
R_count = 0 # Counter for pseudo-random numbers
Do j = 1 to D: # Loop | D= total pseudo-random numbers needed
    If R_count==D:
        end Do
    If h[0]!=0 & h[1]!=0 & h[2]!=0: # != means "different"
        Extend h = [ [0,0,0,] + h ] # Extended array h up to 3 zero cells at the beginning.
```

-continued

Fortran Pseudo-code Implementation of the calculations of Table 4

```
        elif h[0]==0 & h[1]!=0 & h[2]!=0: # == means "equal" when
used in the the IF/ELIF command
            Extend h = [ [0,0] + h ] # Extended array h up to 2 zero
cells at the beginning.
        elif h[0]==0 & h[1]==0 & h[2]!=0:
            Extend h = [ [0] + h ] # Extended array h up to 1 zero cells at
the beginning.
        Do i = 1 to len(h): # Loop
            r = (h[6]* h[-i-3] + h[7]* h[-i-2] + h[8]* h[-i-1] + U[0])
# Total operation product
            R = r %10 # Pseudo-random number produced with
mod10 operation
            C = R//10 # Carry for the next operation product produced
with div10 operation
            U[0] = C # Carry to the array U[0].
            h[-i] = L[-i%3] # The digit in the array L assigned to the
position -i to the array h.
            L[-i%3] = R # The digit in the array R assigned to the
position -i%3s to the array L.
            Print*, R
            R_count = R_count + 1
        end Do
```

Hardware Implementation of the APRNG

Figure 5:
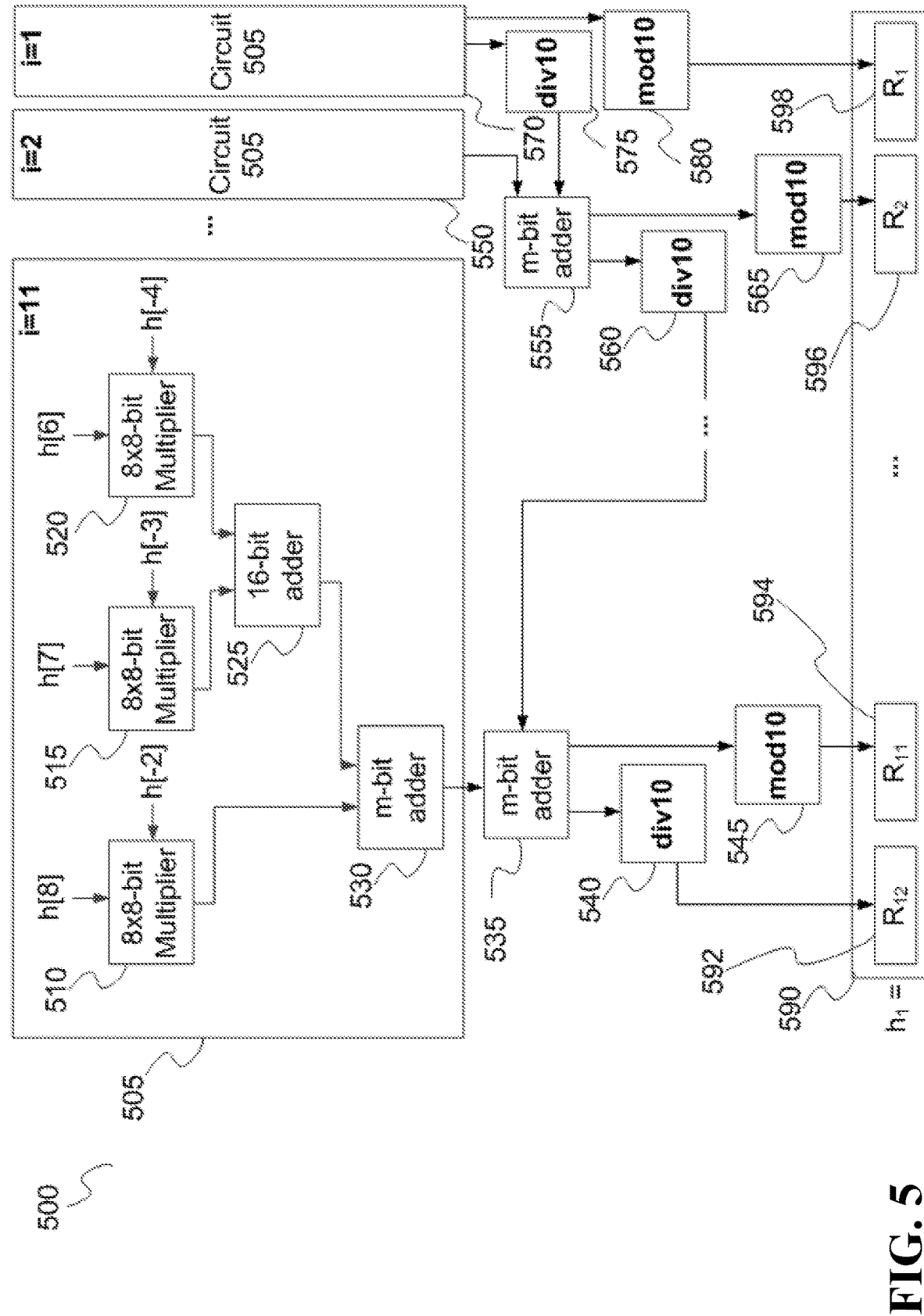
FIG. 5 shows a combinational multiplier circuit implementing the calculations of Table 1.

The present innovative APRNG can be implemented in hardware for higher speed and security. FIG. 5 shows a combinational multiplier circuit implementing the calculations of Table 1.

Circuit 500 of FIG. 5 is implemented, in one aspect, as a special-purpose microchip or micro-processor and contains a series of circuits 505, ..., 550, 570 (for i=1, 2, ..., 11) each containing the same circuit as 505 and being fed with various digits of h. Circuit 505 contains three 8×8 bit multipliers 510, 515, 520 each taking two one-digit input (one-byte) numbers. Circuit 520 takes h [6]=first digit of the multiplier a and h [−4]=fourth digit of the array h and multiplies them. At the same time, 8×8 bit multiplier 515 microprocessor takes as input the numbers: h [7]=second digit of the multiplier a and h [−3]=third digit of the end in the array h and multiplies them. The same goes for the numbers h [8] and h [−2] that the 8×8-bit multiplier 510 takes as input. Then the output from 8×8-bit multiplier 520 and the output from 8×8-bit multiplier 515 are added by 16-bit adder 525. Then the output from 16-bit adder 525 and the output from 8×8-bit multiplier 510 are added by m-bit adder 530. After that, the output from m-bit adder 530 is fed to m-bit adder 535 together with div 10 560 circuit connected to circuit 550. M-bit adder 535 outputs its result to div 10 (integer division) circuit 540 and mod 10 (integer remainder) circuit 545, which produce single-digit random number $R_{12}$ 592 and $R_{11}$ 594, respectively.

Similar to the operation of circuit 505, circuit's 570 m-bit adder outputs its result to div 10 circuit 575 and mod 10 circuit 580. Mod 10 circuit 580 outputs $R_1$ 598 while div 10 circuit 575 outputs to m-bit adder 555 which also receives the output of circuit's 550 m-bit adder. M-bit adder 555 outputs to div 10 circuit 560 and to mod 10 circuit 565. Mod 10 circuit 565 outputs $R_2$ while div 10 circuit 560 outputs to the m-bit adders of other cascaded circuits of the form of circuit 505, which ultimately feed m-bit adder 535 which also receives the output of circuit's 505 m-bit adder 530.

Pseudo-random number $h_1$ 590 is formed by the outputs of div 10 circuit 540 and mod 10 circuits 545, ..., 565, 580 in this order.

Figure 6:
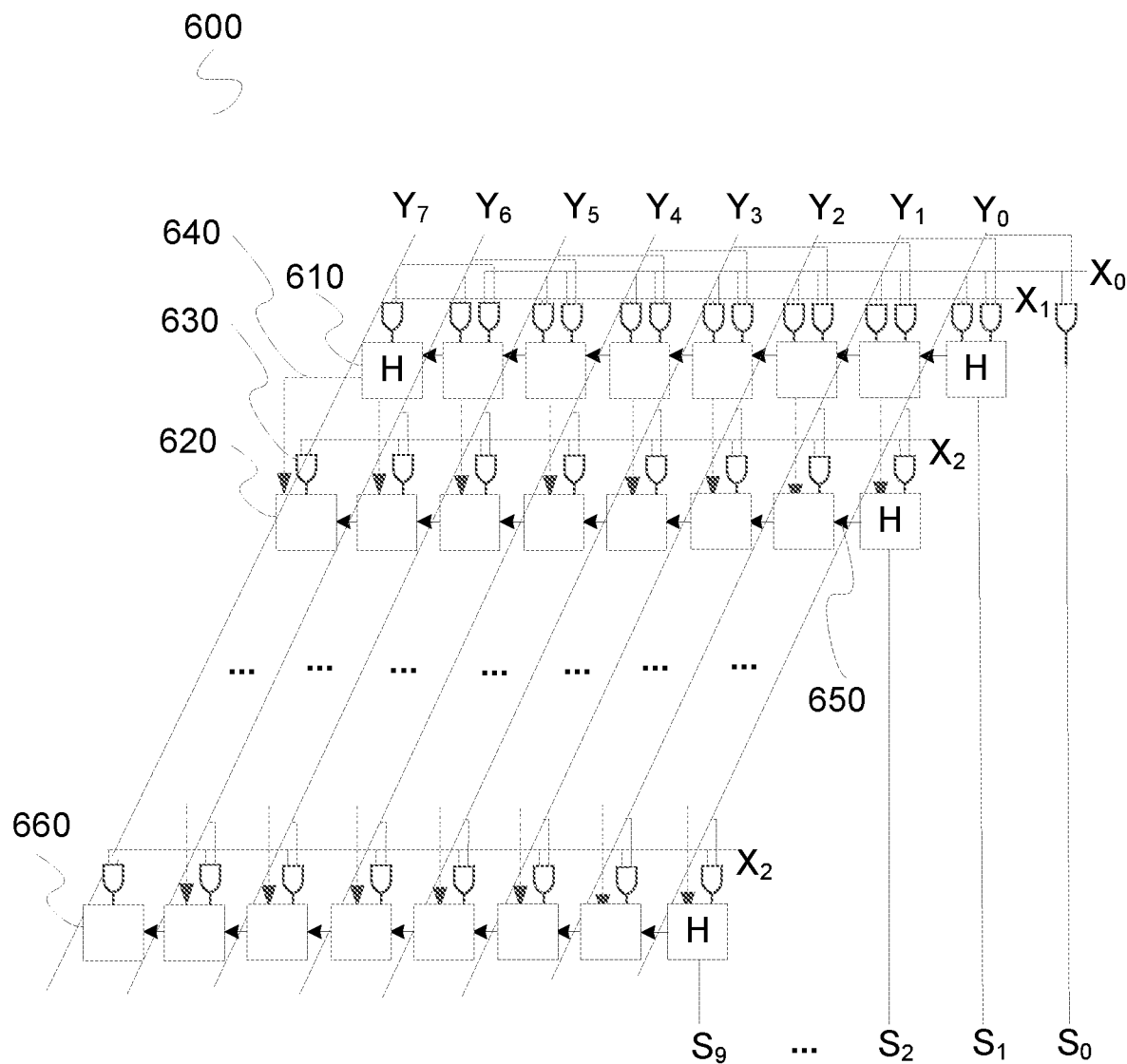
FIG. 6 shows a mid-level hardware implementation of an 8×8 multiplier circuit.

Verilog Code (HDL-Hardware Description Language) with Arithmetic Operations for Circuit in FIG. 5 module Multiplication(input h[6], h[7],h[8],h[−2],h[−3], h[−4],h[−5],h[−6],h[−7],h[−8],h[−9],h[−10],h[−11], h[−12], h[−13], h[−14], h[−15], output U[0], $R_1$, $R_2$, $R_3$, $R_4$, $R_5$, $R_6$, $R_7$, $R_8$, $R_9$, $R_{10}$, $R_{11}$, $R_{12}$, $r_1$, $r_2$, $r_3$, $r_4$, $r_5$, $r_6$, $r_7$, $r_8$, $r_9$, $r_{10}$, $r_{11}$, $r_{12}$);
input [7:0] h[6], h[7],h[8],h[−2],h[−3],h[−4],h[−5],h[−6], h[−7],h[−8],h[−9],h[−10],h[−11], h[−12] h[−13], h[−14], h[−15];
output [7:0] $R_1$, $R_2$, $R_3$, $R_4$, $R_5$, $R_6$, $R_7$, $R_8$, $R_9$, $R_{10}$, $R_{11}$, $R_{12}$;
output [7:0]$r_1$, $r_2$, $r_3$, $r_4$, $r_5$, $r_6$, $r_7$, $r_8$, $r_9$, $r_{10}$, $r_{11}$, $r_{12}$;
output [7:0] U[0];
wire $r_1$=h[6]*h[−4]+h[7]*h[−3]+h[8]*h[−2]+0
assign $R_1$=$r_1$% 10
assign U[0]=$r_1$//10
wire $r_2$=h[6]*h[−5]+h[7]*h[−4]+h[8]*h[−3]+U[0]
assign $R_2$=$r_2$% 10
assign U[0]=$r_2$//10
wire $r_3$=h[6]*h[−6]+h[7]*h[−5]+h[8]*h[−4]+U[0]
assign $R_3$=$r_3$% 10
assign U[0]=$r_3$//10
wire $r_4$=h[6]*h[−7]+h[7]*h[−6]+h[8]*h[−5]+U[0]
assign $R_4$=$r_4$% 10
assign U[0]=$r_4$//10
wire $r_5$=h[6]*h[−8]+h[7]*h[−7]+h[8]*h[−6]+U[0]
assign $R_5$=$r_5$% 10
assign U[0]=$r_5$//10
wire $r_6$=h[6]*h[−9]+h[7]*h[−8]+h[8]*h[−7]+U[0]
assign $R_6$=$r_6$% 10
assign U[0]=$r_6$//10
wire $r_7$=h[6]*h[−10]+h[7]*h[−9]+h[8]*h[−8]+U[0]
assign $R_7$=$r_7$% 10
assign U[0]=$r_7$//10
wire $r_8$=h[6]*h[−11]+h[7]*h[−10]+h[8]*h[−9]+U[0]
assign $R_8$=$r_8$% 10
assign U[0]=$r_8$//10
wire $r_9$=h[6]*h[−12]+h[7]*h[−11]+h[8]*h[−10]+U[0]
assign $R_9$=$r_9$% 10
assign U[0]=$r_9$//10
wire $r_{10}$=h[6]*h[−13]+h[7]*h[−12]+h[8]*h[−11]+U[0]
assign $R_{10}$=$r_{10}$% 10
assign U[0]=$r_{10}$//10
wire $r_{11}$=h[6]*h[−14]+h[7]*h[−13]+h[8]*h[−12]+U[0]
assign $R_{11}$=$r_{11}$% 10
assign U[0]=$r_{11}$//10
wire $r_{12}$=h[6]*h[−15]+h[7]*h[−14]+h[8]*h[−13]+U[0]
assign $R_{12}$=$r_{12}$
endmodule Hardware Implementation of an 8×8 Multiplier Circuit FIG. 6 shows a mid-level hardware implementation of an 8×8 multiplier circuit. 8×8 multiplier circuit 600 is made up of a cascade of circuit modules 610, 620, 660 implementing half adders 610, full adders 620, 660 and logical adders 630 (AND gates). The cascaded circuit modules implement the long multiplications described above by feeding the partial results from each circuit module to the next modules in the cascade.

Figure 7:
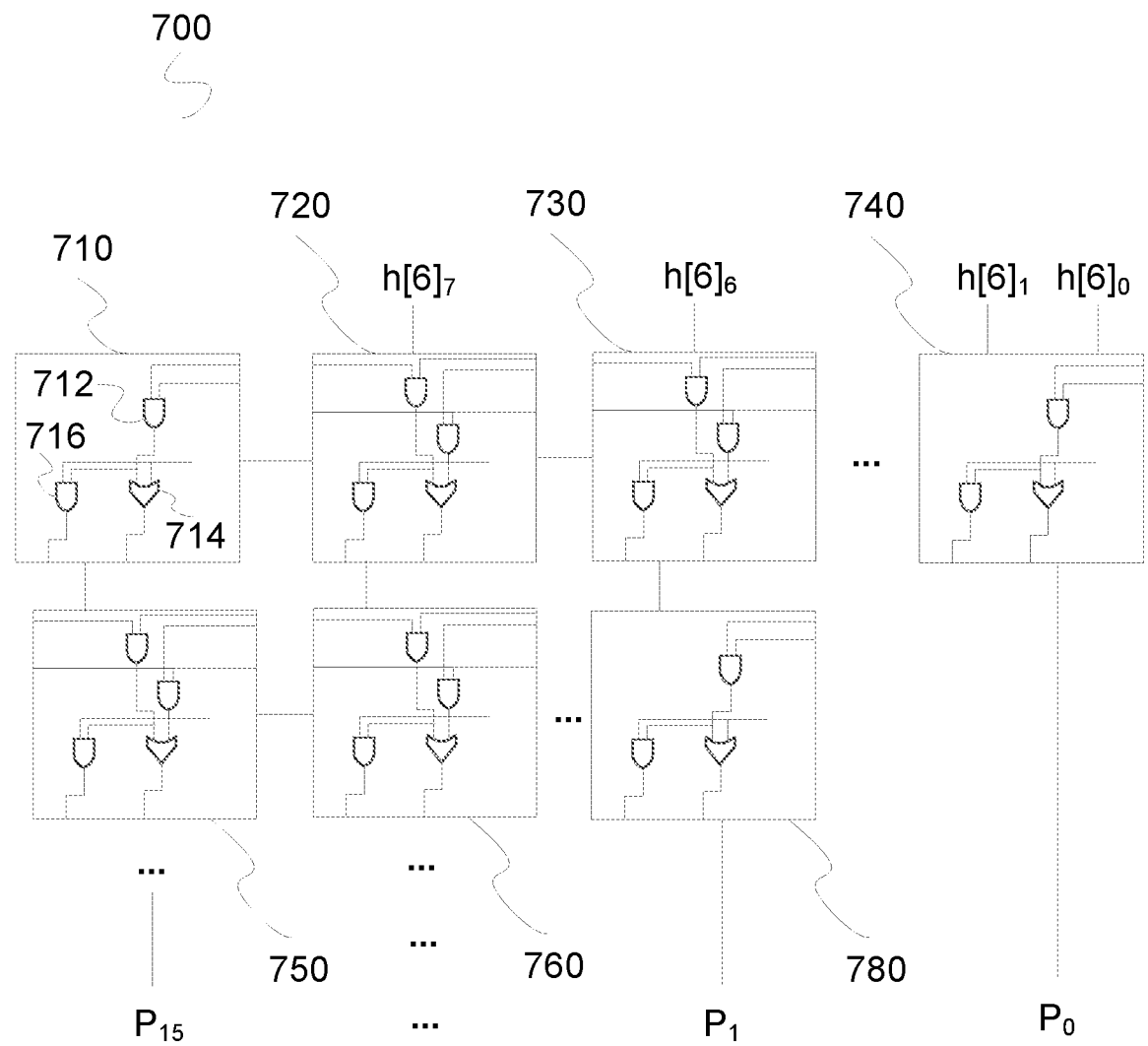
FIG. 7 shows a low-level hardware implementation of an 8×8 multiplier circuit.

FIG. 7 shows a low-level hardware implementation of an 8×8 multiplier circuit. It is a low-level view of the circuit of FIG. 6. Circuit 700 is made up of a cascade of circuit modules 710-780 implementing half adders 710, 780 full adders 720-760 and logical adders (AND gates). The half adders and the full adders are implemented as an ordered collection of interconnected logic AND, OR, and XOR gates.

In particular, a half adder takes as input $h[6]_7$ and $h[−4]_1$ and logically ANDs them at a first AND gate 712, while feeding the result of the operation to an XOR 714 and a second AND gate 716. The result of the second AND gate 716 takes the output of the first logic AND 712 and the output from a full adder 720 it is connected to and logically ends them. The XOR gate 714 takes as input the first AND output 712 and the output from the same full adder 720 that is fed to the second adder 710 and logically XORs 714 them.

A first full adder 750 at a first level takes as input h[6]7 and h[−4]$_0$ and logically ANDs them at a first AND gate, while feeding the result of the operation to a first XOR. The first XOR gate performs a logic XOR operation to the output of the first AND gate and the output of a second AND gate, which second AND gate logically ANDs h[6]$_6$ and h[−4]i. The output of the first XOR gate is fed to a second XOR gate together with the output of a logic OR gate from a second full adder at the first level connected with the first full adder at the same level. The output of the second XOR gate of the first full adder at the first level is fed to a first XOR gate at a third full adder at a second level.

The outputs of the first and the second AND gates of the first full adder 750 at the first level are also fed to a third AND gate whose output is fed, together with the output of the first XOR gate to the OR gate of the same full adder. The output of the first full adder at the first level is then fed to the XOR gate of the half adder. For all other full adders of the circuit of FIG. 7 the output of their OR gate is fed to the second XOR gate of the next full adder at the same level that the full adder is connected to, effectively representing the carry number for the current multiplication operation performed by the full adder.

Effectively, each full adder outputs a partial result from its second XOR gate to a full adder at the next level until the higher level's second XOR gate outputs a single-bit of the pseudo-random number and all the pseudo random single-bit numbers, taken in order, make up a long pseudo random number.

The cascaded circuit modules implement the long multiplications described above by feeding the partial results from each circuit module to the next modules in the cascade. The outputs of circuits 740, 780, . . . , 750 are $P_0$, $P_1$, . . . , $P_{15}$, respectively.

Verilog Code (HDL-Hardware Description Language) with Arithmetic Operations for the Circuit in FIG. 7 module Multiplication(input h[6], h[−4] output P); #FIG. 7
    input [7:0] h[6];
    input [7:0] h[−4];
    output [15:0] P;
    assign P=h[6] *h[−4];
    endmodule Verilog Code (HDL-Hardware Description Language) with Bitwise Operations for the Circuit in FIG. 7 module AndGate1(input h[6]$_0$, h[−4]$_0$, output $P_0$);
    assign $P_0$=h[6]$_0$ & h[−4]$_0$;
    endmodule
    module HA$_2$(input h[6]$_0$, h[6]$_1$, h[−4]$_0$, h[−4]$_1$ output cout2, $P_1$); #(2000)
    assign $P_1$=(h[6]$_1$ & h[−4]$_0$)^(h[6]$_0$ & h[−4]$_1$);
    assign cout2=(h[6]$_1$ & h[−4]$_0$) & (h[6]$_0$ & h[−4]$_1$);
    endmodule
    module FA$_3$(input cout2, h[6]$_2$, h[−4]$_0$, h[6]$_1$, h[−4]$_1$, h[6]$_0$, h[−4]$_2$, output cout3, cout4, P2);
    wire w1=(h[6]$_2$ & h[−4]$_0$);
    wire w2=(h[6]$_1$ & h[−4]$_1$);
    wire w3=(w1^w2);
    wire w4=(w1 &w2);
    wire w5=(w4^cout2);
    wire w6=(w4 & cout2);
    assign cout3=(w4|w6);
    wire w7=(h[6]$_0$ & h[−4]$_2$);
    assign $P_2$=(w5^w7);
    assign cout4=(w5 & w7);
    endmodule
    (repeat the same for the other bits)

Detailed Circuit with Logical Gates Based on the Circuit of FIG. 5

Figure 8:
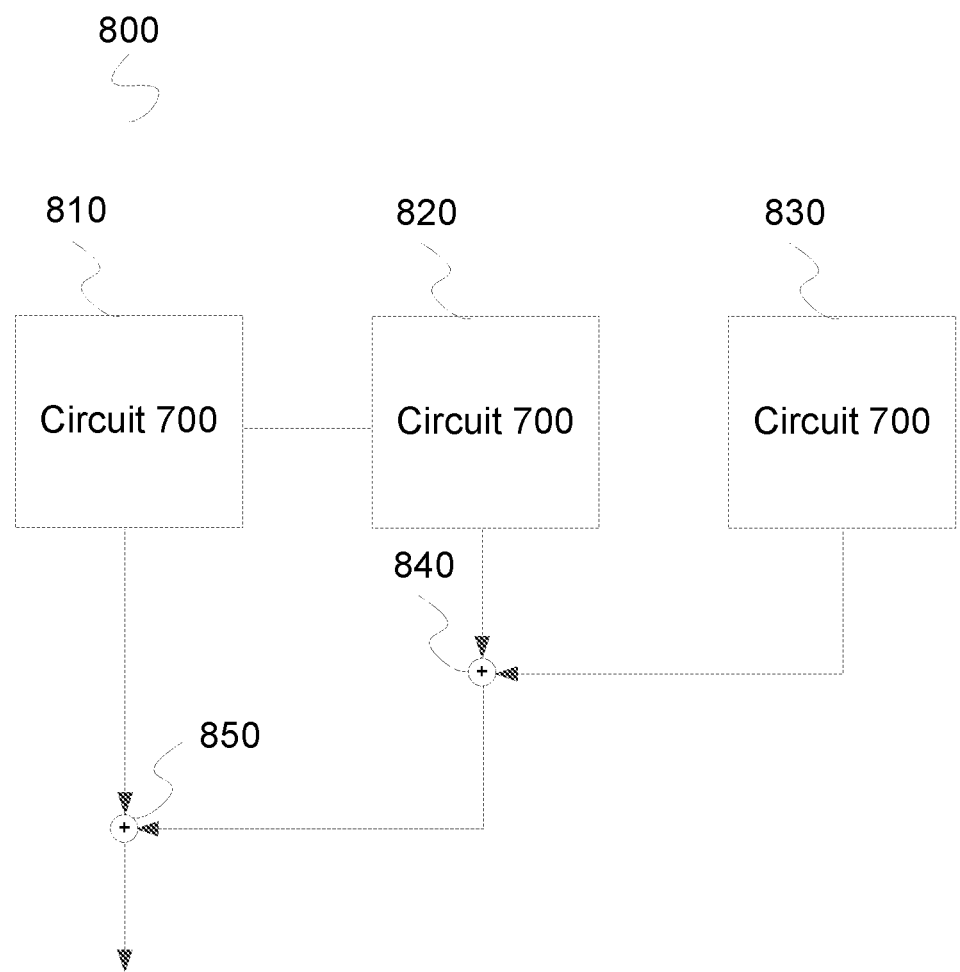
FIG. 8 shows a detailed circuit (901) using Logical Gates based on the circuit of FIG. 5.

FIG. 8 shows a detailed circuit using Logical Gates based on the circuit of FIG. 5. Circuit 800 is a cascade of partial circuits 700 (810, 820, 830) implementing full and partial adders, and outputting towards the div and mod operator circuits (the div and mod operator circuits are not shown). The full and partial adders are the same circuits shown in FIG. 7. Partial results are summed by adders 840, 850.

Figure 9:
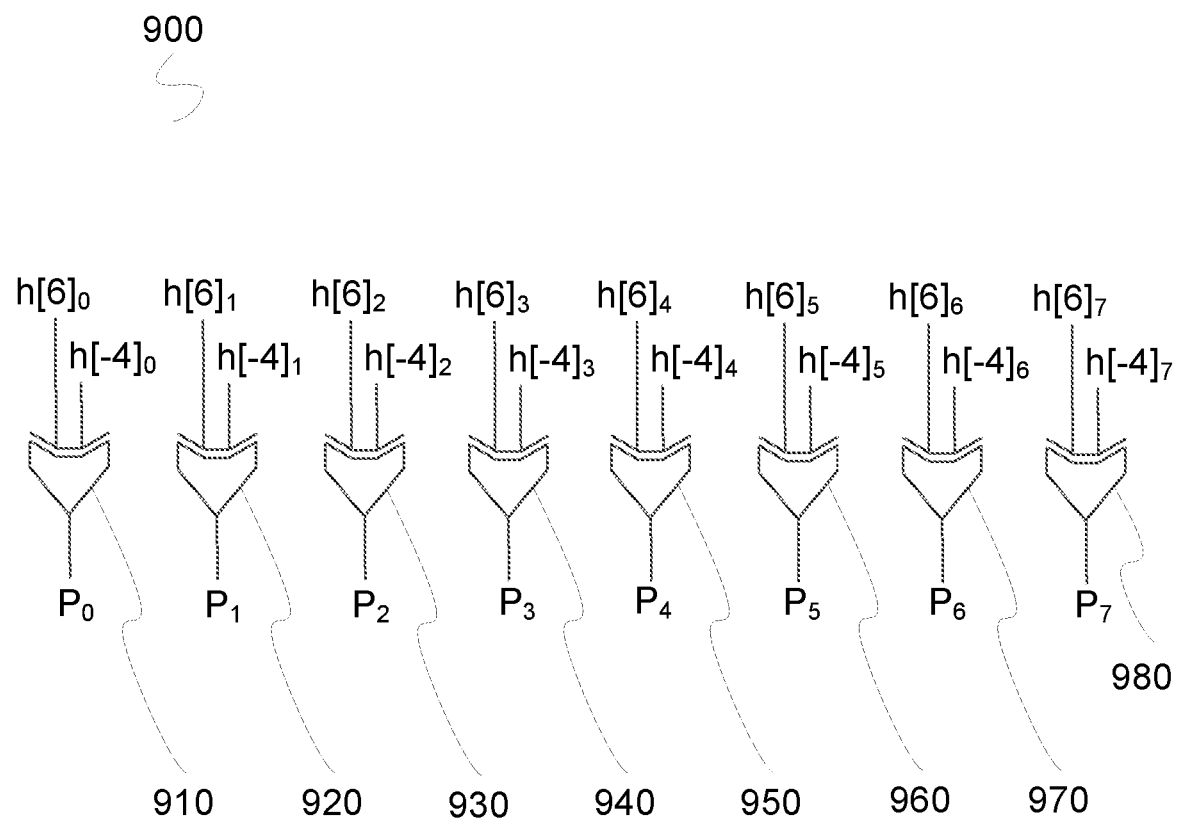
FIG. 9: shows a detailed circuit for the XOR operations of the 4th Exemplary Embodiment.

Verilog Code (HDL-Hardware Description Language) with Arithmetic Operations for the Circuit in FIG. 8 module Multiplication(input h[6], h[7], h[8], h[−4], h[−3], h[−2], output Sum1, $r_1$, $R_1$); #FIG. 9
    input [7:0] h[6], h[7], h[8], h[−4], h[−3], h[−2];
    output [16:0] Sum1;
    output [16:0] $r_1$;
    output [7:0] $R_1$;
    output [7:0] U[0];
    wire sum1=h[6]*h[−4]+h[7]*h[−3]
    wire $r_1$=sum1+h[8]*h[−2]
    assign $R_1$=$r_1$% 10
    assign U[0]=$r_1$//10
    endmodule The above hardware circuits are used by the present innovative APRNG when implemented in hardware for speeding up the calculations needed to create the pseudo random number sequences. Despite the fact that logic gates and circuit modules known in prior art for other purposes are also used above, the present innovative APRNG presents a novel hardware implementation by modifying the operation of the circuit modules. In particular, the present APRNG selectively switches the above circuit modules (refer to FIG. 5, as opposed to the use of the circuit modules for ordinary arithmetic calculations), effectively achieving significant speed improvements as opposed to any "ordinary" calculation of the pseudo random numbers without using the proposed simplifications.

Implementation of the 4$^{th}$ Exemplary Embodiment

The 4$^{th}$ embodiment is a variation of the 3$^{rd}$ embodiment, where the multiplication of each digit of h with each digit of a is replaced with an XOR operation. Table 6, in an example table Xr of the implementation of the XOR operations for all single-digit decimal number 1 . . . 9. It is equivalent to the M table used in the previous embodiments.

TABLE 6

Example table Xr of the implementation of the
XOR operations for all single-digit decimal number 1 . . . 9.

| Xr | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 0 | 3 | 2 | 5 | 4 | 7 | 6 | 9 | 8 |
| 2 | 2 | 3 | 0 | 1 | 6 | 7 | 4 | 5 | 10 | 11 |
| 3 | 3 | 2 | 1 | 0 | 7 | 6 | 5 | 4 | 11 | 10 |
| 4 | 4 | 5 | 6 | 7 | 0 | 1 | 2 | 3 | 12 | 13 |
| 5 | 5 | 4 | 7 | 6 | 1 | 0 | 3 | 2 | 13 | 12 |
| 6 | 6 | 7 | 4 | 5 | 2 | 3 | 0 | 1 | 14 | 15 |

TABLE 6-continued

Example table Xr of the implementation of the
XOR operations for all single-digit decimal number 1 ... 9.

| Xr | 0 | 1 | 2  | 3  | 4  | 5  | 6  | 7  | 8  | 9  |
|----|---|---|----|----|----|----|----|----|----|----|
|    | 7 | 6 | 5  | 4  | 3  | 2  | 1  | 0  | 15 | 14 |
|    | 8 | 9 | 10 | 11 | 12 | 13 | 14 | 15 | 0  | 1  |
|    | 9 | 8 | 11 | 10 | 13 | 12 | 15 | 14 | 1  | 0  |

TABLE 7

Example implementation of the XOR operations between digits of h and a.

| | | | | | | | XoR | | | | | | | | C | R |
|---|---|---|---|---|---|---|---|---|---|---|---|---|---|---|---|---|
| 0 | 0 | 0 | 8 | 0 | 3 | 7 | 2 | 9 | 1 | 5 | 2 | 0 | 0 | 0 | | |
| | | | | | | | | | | 7 | 2 | 9 | = 5 + 2 + 9 + 0 = 16 | | 1 | 6 |
| | | | | | | | | | 7 | 2 | 9 | | = 2 + 0 + 9 + 1 = 12 | | 1 | 2 |
| | | | | | | | | 7 | 2 | 9 | | | = 6 + 7 + 11 + 1 = 25 | | 2 | 5 |
| | | | | | | | 7 | 2 | 9 | | | | = 14 + 3 + 12 + 2 = 31 | | 3 | 1 |
| | | | | | | 7 | 2 | 9 | | | | | = 5 + 11 + 8 + 3 = 27 | | 2 | 7 |
| | | | | | 7 | 2 | 9 | | | | | | = 0 + 0 + 0 + 2 = 02 | | 0 | 2 |
| | | | | 7 | 2 | 9 | | | | | | | = 4 + 5 + 11 + 0 = 20 | | 2 | 0 |
| | | | 7 | 2 | 9 | | | | | | | | = 7 + 1 + 14 + 2 = 24 | | 2 | 4 |
| | | 7 | 2 | 9 | | | | | | | | | = 15 + 2 + 10 + 2 = 29 | | 2 | 9 |
| | 7 | 2 | 9 | | | | | | | | | | = 7 + 10 + 9 + 2 = 28 | | 2 | 8 |
| 7 | 2 | 9 | | | | | | | | | | | = 7 + 2 + 1 + 2 = 12 | | 1 | 2 |
| 7 | 2 | 9 | | | | | | | | | | | = 7 + 2 + 9 + 1 = 19 | | | 9 |

Table 7 shows an example implementation of the XOR operations between digits of h and a. The same logic and resulting random numbers R and carry C as in the previous exemplary implementations are used.

Hardware Implementation of the 4th Exemplary Embodiment

FIG. 9 shows a detailed circuit for the XOR operations of the 4th Exemplary Embodiment. Circuit 900 comprises a series of XOR gates 910-980. The first XOR gate 910 takes as input signals $h[6]_0$ and $h[-4]_0$ and produces result $P_0$. The second XOR gate 920 takes as input signals $h[6]_1$ and $h[-4]_1$ and produces result $P_1$. Similar is the operation of the remaining XOR gates 930-980.

Verilog code (HDL-Hardware Description Language) with Bitwise operations for circuit in FIG. 9 module Multiplication(input h[6]0, h[-4]0, h[6]1, h[-4]1, h[6]2, h[-4]2, h[6]3, h[-4]3, h[6]4, h[-4]4, h[6]5, h[-4]5, h[6]6, h[-4]6, h[6]7, h[-4]7, output P0, P1, P2, P3, P4, P5, P6, P7); #Table 7 input [0:0] h[6]0, h[-4]0, h[6]1, h[-4]1, h[6]2, h[-4]2, h[6]3, h[-4]3, h[6]4, h[-4]4, h[6]5, h[-4]5, h[6]6, h[-4]6, h[6]7, h[-4]7;

output [0:0] P0, P1, P2, P3, P4, P5, P6, P7;

assign P0=h[6]0^h[-4]0;

assign P1=h[6]1^h[-4]1;

assign P2=h[6]2^h[-4]2;

assign P3=h[6]3^h[-4]3;

assign P4=h[6]4^h[-4]4;

assign P5=h[6]5^h[-4]5;

assign P6=h[6]6^h[-4]6;

assign P7=h[6]7^h[-4]7;

Endmodule

Figure 10:
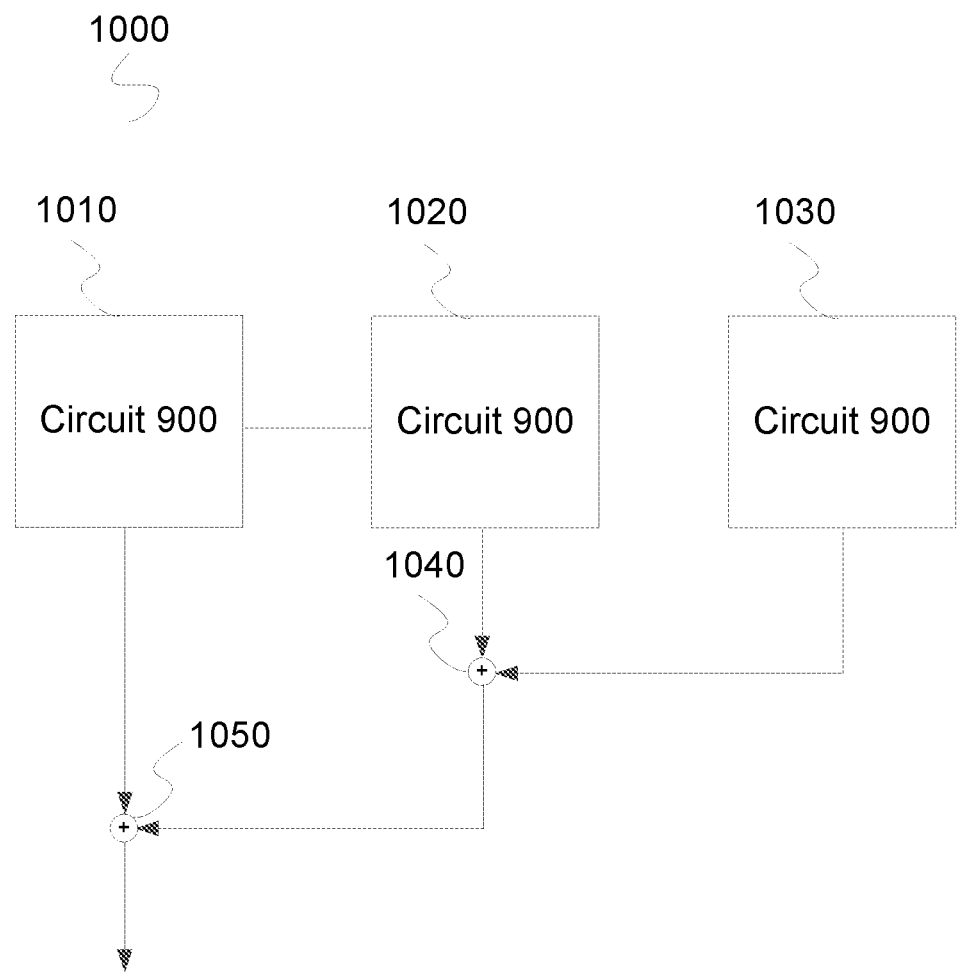
FIG. 10 shows a detailed circuit for the XOR operations of the 4th Exemplary Embodiment for the creation of a Sequence of Pseudo Random Numbers.

Hardware Implementation of the 4th Exemplary Embodiment for the Creation of a Sequence of Pseudo Random Numbers FIG. 10 shows a detailed circuit for the XOR operations of the 4th Exemplary Embodiment for the creation of a Sequence of Pseudo Random Numbers. Circuit 1000 is a cascade of partial circuits 900 (1010, 1020, 1030) implementing XOR circuits, and outputting towards the div and mod operator circuits (the div and mod operator circuits are not shown). The XOR circuits are the same circuits shown in FIG. 9. Partial results are summed by adders 1040, 1050.

Overall Hardware Implementation of the APRNG

Figure 11:
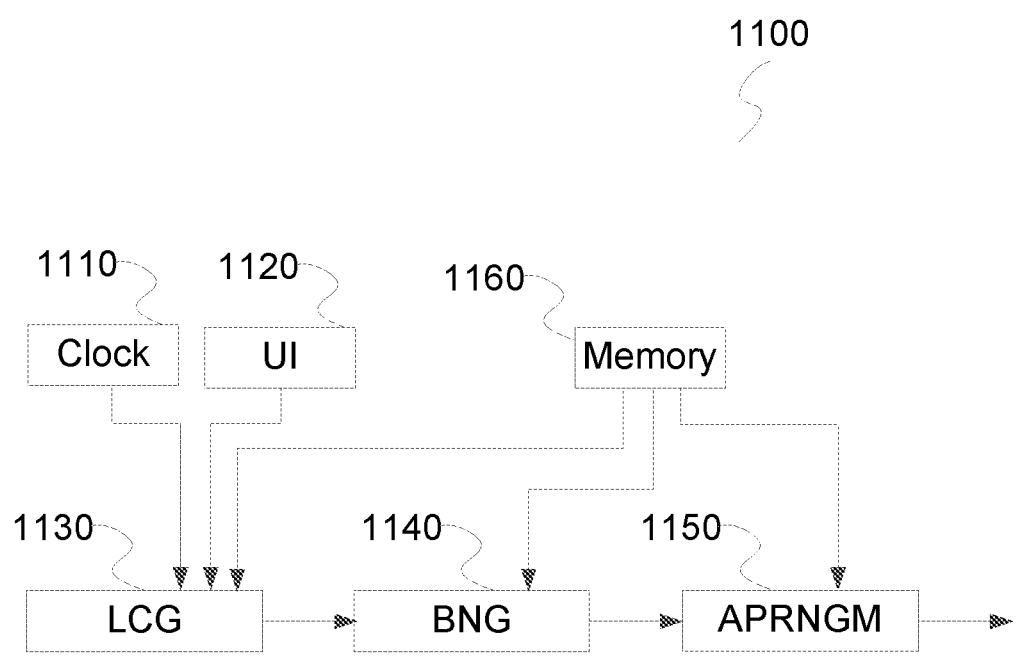
FIG. 11 shows an exemplary overall hardware architecture of the APRNG.

FIG. 11 shows an exemplary overall hardware architecture of the APRNG. The APRNG 1100 is implemented by one or more processors, each having one or more processing cores. The processors may be located inside the same computing apparatus, or in more than one computing apparatuses (e.g. in the case of distributed or cloud computing). These implementations are obvious to any reader of basic skill in related art.

Considering, for simplicity, the exemplary implementation where a single processor with a single processing core is used to implement the APRNG, APRNG 1100 is implemented using an LCG module 1130 for generating a first sequence of pseudo random numbers, a Big Number Generator (BNG) module 1140 for generating big numbers using the first sequence of pseudo random numbers, and an Aperiodic Pseudo Random Number Generator Module (APRNGM) 1150 for calculating aperiodic pseudo random numbers from the big numbers. The APRNG is also connected to a computer clock module 1110, and to a user interface module 1120 for accepting user input. The LCG 1130, BNG 1140, and APRNGM 1150 modules are connected with a memory module 1160. Additional modules that are obvious are omitted. Equally, it is accepted that modifications to this architecture can be made.

In a variation of the exemplary implementation of FIG. 11 LCG module 1130 may be replaced by any pseudo-random number generator module.

The above exemplary implementations of the present innovative solution are not to be deemed as falling into the category of not patentable subject matter, and in particular they do not constitute automation or mere computer implementations of mental processes and non-patentable subject matter. The reason for not being directed to mental processes and non-patentable subject matter stems from the fact that the above exemplary implementations use a set of methodologies, hardware and software implementations that combine and transform individual known concepts, circuits, and software for general-purpose solutions to specific solutions for APRNGs with faster operation than prior art, reduced processing requirements, and significantly longer periods in the created pseudo-random number generators. As a result, the known concepts, circuits, and software are repurposed to operate in a novel and distinct way that solve a very specific and previously unsolved problem, thus rendering them innovative and unanticipated to persons of ordinary skill in related art.

The examples used above to describe the present innovative solution should not be viewed as limiting the scope of the present innovative solution. The present innovative solution may be applied to use scenarios and settings other than those described in the presented examples.

The above exemplary are intended for use either as a standalone system or method in any conceivable scientific and business domain, or as part of other scientific and business methods, processes and systems.

The above exemplary embodiment descriptions are simplified and do not include hardware and software elements that are used in the embodiments but are not part of the current invention, are not needed for the understanding of the embodiments, and are obvious to any user of ordinary skill in related art. Furthermore, variations of the described method, system architecture, and software architecture are possible, where, for instance, method steps, and hardware and software elements may be rearranged, omitted, replaced with equivalent, or new added.

Various embodiments of the invention are described above in the Detailed Description. While these descriptions directly describe the above embodiments, it is understood that those skilled in the art may conceive modifications and/or variations to the specific embodiments shown and described herein unless specifically excluded. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer implemented method of generating aperiodic pseudo random numbers, the method comprising:
   using a pseudo-random number generator module to generate a first sequence of large pseudo random numbers, where for each large pseudo random number in the first sequence of large pseudo random numbers the pseudo-random number generator module (a) multiplies a first constant with a second constant and with a third constant to calculate a seed number, (b) sets the first constant as a current constant, and (c) for each large pseudo random number multiplies the seed number with the current constant and sets (i) the current constant as the next constant in an ordered set of constants containing the first constant, the second constant, and the third constant, and (ii) the pseudo-random number as the seed number; and
   using a module for splitting big numbers output by the pseudo-random number generator module for (d) creating a second sequence of pseudo random numbers by (i) selectively splitting each large pseudo-random number in the first sequence of large pseudo random numbers into a plurality of groups of digits of the large pseudo-random number, and (ii) associating each group of digits of each large pseudo-random number in the first sequence of large pseudo random numbers with a pseudo random number in the second sequence of pseudo random numbers, and (e) for outputting the second sequence of pseudo random numbers.

2. The computer implemented method of claim 1, where:
   the pseudo-random number generator module implements steps (a) and (c) as a first lookup operation at a first array for the large pseudo random numbers, and as a second lookup operation at the first array for carry numbers; and the first array comprises (a) all the pseudo random numbers that can be calculated for the seed number and (i) the first constant, (ii) the second constant, and (iii) the third constant and which pseudo random numbers are calculated as a sum of a plurality of multiplications between two single-digit decimal numbers, and (b) a plurality of carry numbers, where each of the plurality of carry numbers is associated with a pseudo random number, and each of the plurality of carry numbers is calculated as a remainder of an integer division between the pseudo random number associated with the carry number, and a fourth constant.

3. The computer implemented method of claim 2, where the plurality of multiplications between the two single-digit decimal numbers, used to construct the first array, is calculated by a plurality of lookup operations at a second array, where the second array comprises multiplication results for all pairs of single-digit decimal numbers.

4. The computer implemented method of claim 2, where:
the first constant, the second constant, and the third constant are selected by one of (a) a user, (b) an automated process, and (c) from a computer clock.

5. The computer implemented method of claim 3, the plurality of lookup operations and a plurality of additions are implemented with a cascade of a plurality of interconnected full adder circuits and a half adder circuit.

6. The computer implemented method of claim 5, where the full adder circuits and the half adder circuit are implemented with interconnected logic AND, OR and XOR gates.

7. The method of claim 1, where the pseudo-random number generator module implements steps (a) and (c) as:
a look-up operation at one array comprising all single-digit pseudo random numbers in the first sequence of large pseudo random numbers; and
another look-up operation at another array comprising all the carry numbers associated with single-digit pseudo random numbers in the one array.

8. The method of claim 1, where the first constant, the second constant, and the third constant are integer numbers with at least 7 digits each.

9. The method of claim 1, where for each large pseudo random number in the first sequence of large pseudo random numbers, the pseudo-random number generator module (i) multiplies the seed number with the current constant and (ii) sets the current constant as a remainder of the division of the result of the integer division of the seed number by number 10 to a power of double the number of digits in the first constant, and by number 10 to a power of the number of digits in the first constant.

10. The method of claim 2, where for each large pseudo random number in the first sequence of large pseudo random numbers, the pseudo-random number generator module performs an Exclusive OR (XOR) operation on the seed number and the current constant, where the XOR operation is implemented as a lookup operation at an array holding all possible XOR results between all single-digit decimal numbers.

11. A computing apparatus for generating aperiodic pseudo random numbers, the computing apparatus comprising:
a memory module configured for storing a plurality of arrays;
a computer clock module;
a user interface module; and
a processor comprising:
a pseudo-random number generator module configured for generating a first sequence of large pseudo random numbers, where for each large pseudo random number in the first sequence of large pseudo random numbers the pseudo-random number generator module (a) multiplies a first constant with a second constant and with a third constant to calculate a seed number, (b) sets the first constant as a current constant, and (c) for each large pseudo random number multiplies the seed number with the current constant and sets (i) the current constant as the next constant in an ordered set of constants containing the first constant, the second constant, and the third constant, and (ii) the pseudo-random number as the seed number; and
a module for splitting big numbers output by the pseudo-random number generator module configured for (d) creating a second sequence of pseudo random numbers by (i) selectively splitting each large pseudo-random number in the first sequence of large pseudo random numbers into a plurality of groups of digits of the large pseudo-random number, and (ii) associating each group of digits of each large pseudo-random number in the first sequence of large pseudo random numbers with a pseudo random number in the second sequence of pseudo random numbers, and (e) for outputting the second sequence of pseudo random numbers.

12. The computing apparatus of claim 11, where:
the pseudo-random number generator module implements steps (a) and (c) as a first lookup operation at a first array for the large pseudo random numbers, and as a second lookup operation at the first array for carry numbers;
the first array comprises (a) all the pseudo random numbers that can be calculated for the seed number and (i) the first constant, (ii) the second constant, and (iii) the third constant and which pseudo random numbers are calculated as a sum of a plurality of multiplications between two single-digit decimal numbers, and (b) a plurality of carry numbers, where each of the plurality of carry numbers is associated with a pseudo random number, and each of the plurality of carry numbers is calculated as a remainder of an integer division between the pseudo random number associated with the carry number, and a fourth constant;
the plurality of multiplications between the two single-digit decimal numbers, used to construct the first array, is calculated by a plurality of lookup operations at a second array, where the second array comprises multiplication results for all pairs of single-digit decimal numbers; and
the first constant, the second constant, and the third constant are selected by one of (a) a user, (b) an automated process, and (c) from a computer clock.

13. The computing apparatus of claim 12, where:
the plurality of lookup operations and a plurality of additions are implemented with a cascade of a plurality of interconnected full adder circuits and a half adder circuit; and
the full adder circuits and the half adder circuit are implemented with interconnected logic AND, OR and XOR gates.

14. The computing apparatus of claim 11, where:
the pseudo-random number generator module implements steps (a) and (c) as a look-up operation at one array comprising all single-digit pseudo random numbers in the first sequence of large pseudo random numbers, and as another look-up operation at another array comprising all the carry numbers associated with single-digit pseudo random numbers in the one array;

the first constant, the second constant, and the third constant are integer numbers with at least 7 digits each; and for each large pseudo random number in the first sequence of large pseudo random numbers, the pseudo-random number generator module (i) multiplies the seed number with the current constant and (ii) sets the current constant as a remainder of the division of the result of the integer division of the seed number by number 10 to a power of double the number of digits in the first constant, and by number 10 to a power of the number of digits in the first constant.

15. The computing apparatus of claim 12, where for each large pseudo random number in the first sequence of large pseudo random numbers, the pseudo-random number generator module performs an Exclusive OR (XOR) operation on the seed number and the current constant, where the XOR operation is implemented as a lookup operation at an array holding all possible XOR results between all single-digit decimal numbers.

16. A non-transitory computer readable medium having stored thereon instructions that, when executed by a processor, cause the processor to generate aperiodic pseudo random numbers, by executing the steps comprising:

using a pseudo-random number generator module to generate a first sequence of large pseudo random numbers, where for each large pseudo random number in the first sequence of large pseudo random numbers the pseudo-random number generator module (a) multiplies a first constant with a second constant and with a third constant to calculate a seed number, (b) sets the first constant as a current constant, and (c) for each large pseudo random number multiplies the seed number with the current constant and sets (i) the current constant as the next constant in an ordered set of constants containing the first constant, the second constant, and the third constant, and (ii) the pseudo-random number as the seed number; and using a module for splitting big numbers output by the pseudo-random number generator module to (d) create a second sequence of pseudo random numbers by (i) selectively splitting each large pseudo-random number in the first sequence of large pseudo random numbers into a plurality of groups of digits of the large pseudo-random number, and (ii) associating each group of digits of each large pseudo-random number in the first sequence of large pseudo random numbers with a pseudo random number in the second sequence of pseudo random numbers, and (e) to output the second sequence of pseudo random numbers.

17. The non-transitory computer of claim 16, where:

the pseudo-random number generator module implements steps (a) and (c) as a first lookup operation at a first array for the large pseudo random numbers, and as a second lookup operation at the first array for carry numbers;

the first array comprises (a) all the pseudo random numbers that can be calculated for the seed number and (i) the first constant, (ii) the second constant, and (iii) the third constant and which pseudo random numbers are calculated as a sum of a plurality of multiplications between two single-digit decimal numbers, and (b) a plurality of carry numbers, where each of the plurality of carry numbers is associated with a pseudo random number, and each of the plurality of carry numbers is calculated as a remainder of an integer division between the pseudo random number associated with the carry number, and a fourth constant;

the plurality of multiplications between the two single-digit decimal numbers, used to construct the first array, is calculated by a plurality of lookup operations at a second array, where the second array comprises multiplication results for all pairs of single-digit decimal numbers; and the first constant, the second constant, and the third constant are selected by one of (a) a user, (b) an automated process, and (c) from a computer clock.

18. The non-transitory computer readable medium of claim 17, where:

the plurality of lookup operations and a plurality of additions are implemented with a cascade of a plurality of interconnected full adder circuits and a half adder circuit; and the full adder circuits and the half adder circuit are implemented with interconnected logic AND, OR and XOR gates.

19. The non-transitory computer readable medium of claim 16, where:

the pseudo-random number generator module implements steps (a) and (c) as a look-up operation at an one array comprising all single-digit pseudo random numbers in the first sequence of large pseudo random numbers, and as another look-up operation at another array comprising all the carry numbers associated with single-digit pseudo random numbers in the one array;

the first constant, the second constant, and the third constant are integer numbers with at least 7 digits each; and for each large pseudo random number in the first sequence of large pseudo random numbers, the pseudo-random number generator module (i) multiplies the seed number with the current constant and (ii) sets the current constant as a remainder of the division of the result of the integer division of the seed number by number 10 to a power of double the number of digits in the first constant, and by number 10 to a power of the number of digits in the first constant.

20. The non-transitory computer readable medium of claim 16, where for each large pseudo random number in the first sequence of large pseudo random numbers, the pseudo-random number generator module performs an Exclusive OR (XOR) operation on the seed number and the current constant, where the XOR operation is implemented as a lookup operation at an array holding all possible XOR results between all single-digit decimal numbers.

* * * * *